US011297054B1

(12) United States Patent
Cooper et al.

(10) Patent No.: US 11,297,054 B1
(45) Date of Patent: Apr. 5, 2022

(54) AUTHENTICATION SYSTEM(S) WITH MULTIPLE AUTHENTICATION MODES USING ONE-TIME PASSWORDS OF INCREASED SECURITY

(71) Applicant: INTERNATIONAL BUSINESS MACHINES CORPORATION, Armonk, NY (US)

(72) Inventors: Ross David Cooper, Hyde Park, NY (US); Michael Onghena, Holly Springs, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/063,765

(22) Filed: Oct. 6, 2020

(51) Int. Cl.
*H04L 9/40* (2022.01)
*H04L 29/06* (2006.01)

(52) U.S. Cl.
CPC ...... *H04L 63/0838* (2013.01); *H04L 63/0846* (2013.01); *H04L 63/108* (2013.01)

(58) Field of Classification Search
CPC ............. H04L 63/0838; H04L 63/0846; H04L 63/108; H04W 12/61
See application file for complete search history.

(56) References Cited

U.S. PATENT DOCUMENTS

| | | | |
|---|---|---|---|
| 5,592,553 A * | 1/1997 | Guski | G06F 21/31 713/159 |
| 5,661,807 A | 8/1997 | Guski et al. | |
| 6,243,470 B1 | 6/2001 | Coppersmith et al. | |
| 8,586,022 B2 * | 11/2013 | Szalay | A61K 38/1841 435/8 |

(Continued)

FOREIGN PATENT DOCUMENTS

| | | |
|---|---|---|
| CN | 103580874 A | 2/2014 |
| CN | 106790274 A | 5/2017 |

(Continued)

OTHER PUBLICATIONS

Black et al., "CBC MACs for Arbitrary-Length Messages: The Three-Key Constructions", Annual International Cryptology Conference, Published by Springer-Verlag, Berlin, Heidelberg, pp. 197-215 (2000).

(Continued)

*Primary Examiner* — Linglan E Edwards
(74) *Attorney, Agent, or Firm* — Teddi Maranzano, Esq.; Kevin P. Radigan, Esq.; Heslin Rothenberg Farley & Mesiti P.C.

(57) ABSTRACT

Authentication processing is provided which includes generating an authentication parameter as a function of a time-dependent input using a predetermined transformation having an inverse transformation. Multiple authentication modes are supported, with a bit-length of the time-dependent input of one authentication mode being different from a bit-length of the time-dependent input of another authentication mode. Generating the authentication parameter is dependent, in part, on whether the time-dependent input is of the one authentication mode or the other authentication mode. A time-dependent password including a character string is generated from the authentication parameter using another predetermined transformation having another inverse transformation. The time-dependent password is forwarded within the authentication system for authentication by an authenticator.

15 Claims, 15 Drawing Sheets

(56) References Cited

U.S. PATENT DOCUMENTS

| | | | |
|---|---|---|---|
| 9,334,332 B2* | 5/2016 | Hadari | G01N 33/566 |
| 9,605,081 B2* | 3/2017 | Hadari | A61K 39/39558 |
| 10,927,365 B2* | 2/2021 | Johnson | C12Y 112/00 |
| 11,088,839 B2* | 8/2021 | Upadhye | H04L 9/3228 |
| 2002/0025037 A1 | 2/2002 | Sano | |
| 2002/0051537 A1 | 5/2002 | Rogaway | |
| 2002/0101915 A1* | 8/2002 | Zhang | H04L 1/006 375/222 |
| 2003/0191950 A1 | 10/2003 | Patel et al. | |
| 2009/0328168 A1* | 12/2009 | Lee | G06F 21/41 726/6 |
| 2014/0189831 A1* | 7/2014 | Kemshall | H04L 9/088 726/6 |
| 2020/0089904 A1 | 3/2020 | Lin | |
| 2020/0313891 A1 | 10/2020 | Upadhye et al. | |

FOREIGN PATENT DOCUMENTS

| | | |
|---|---|---|
| CN | 111131550 A | 5/2020 |
| WO | WO 2018/002585 A1 | 1/2018 |

OTHER PUBLICATIONS

Han et al. "Scalable Cryptographic Scheme for Networked Multimedia Applications", Proceedings 2001 International Conference on Image Processing (Cat. No. 01CH37205), vol. 3, IEEE, pp. 987-990 (2001).

Halevi et al., "Extending EME to Handle Arbitrary-Length Messages with Associated Data", International Conference on Cryptology in India, Published by Springer-Verlag, Berlin, Heidelberg, 32 pages, (2004).

Mel et al., "The NIST Definition of Cloud Computing," National Institute of Standards and Technology, Information Technology Laboratory, Special Publication 800-145, Sep. 2011 (pp. 1-7).

International Business Machines Corporation (IBM), "Power ISA™ Version 2.07B," Apr. 9, 2015 (pp. 1-1527).

IBM Publication, "z/Architecture Principles of Operation," IBM® Publication No. SA22-7832-12, Thirteenth Edition, Sep. 2019 (pp. 1-2000).

PCT Application No. PCT/CN2021/114000, International Search Report (ISR) & Written Opinion, dated Nov. 23, 2021 (9 pages) (Year: 2021).

* cited by examiner

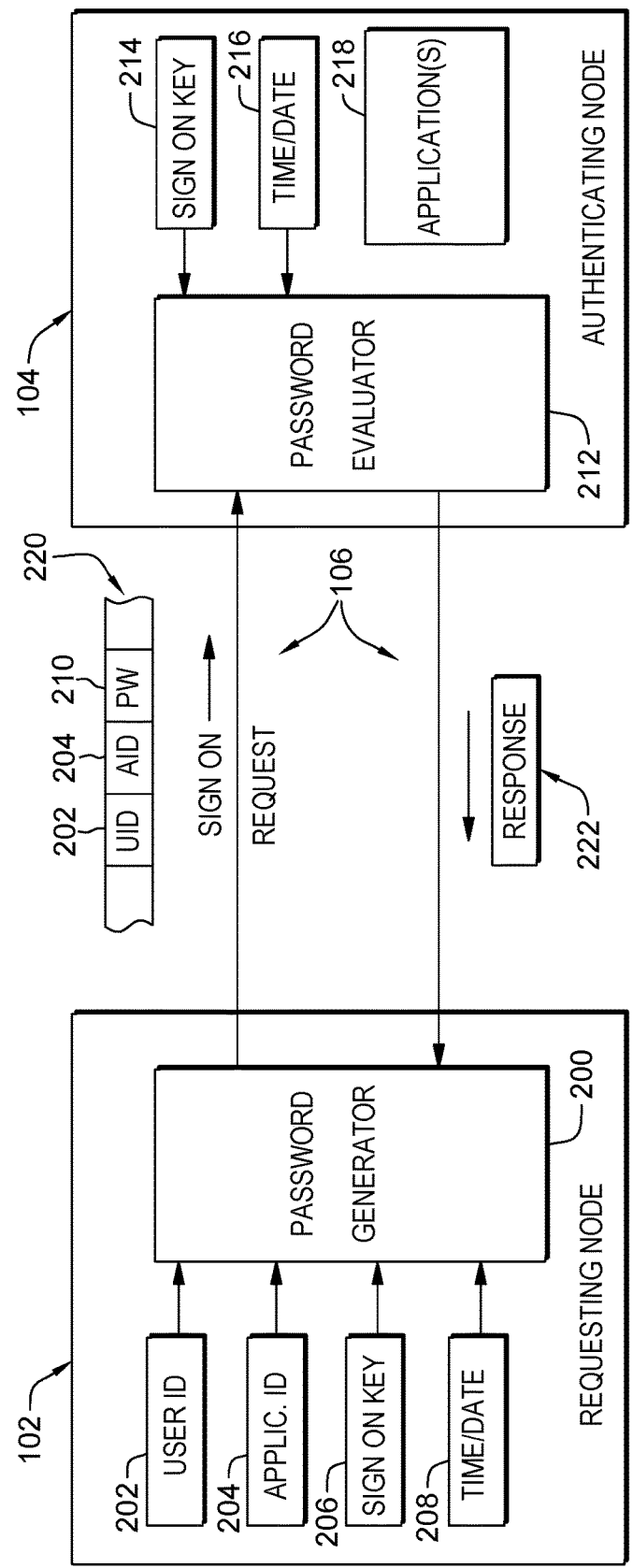

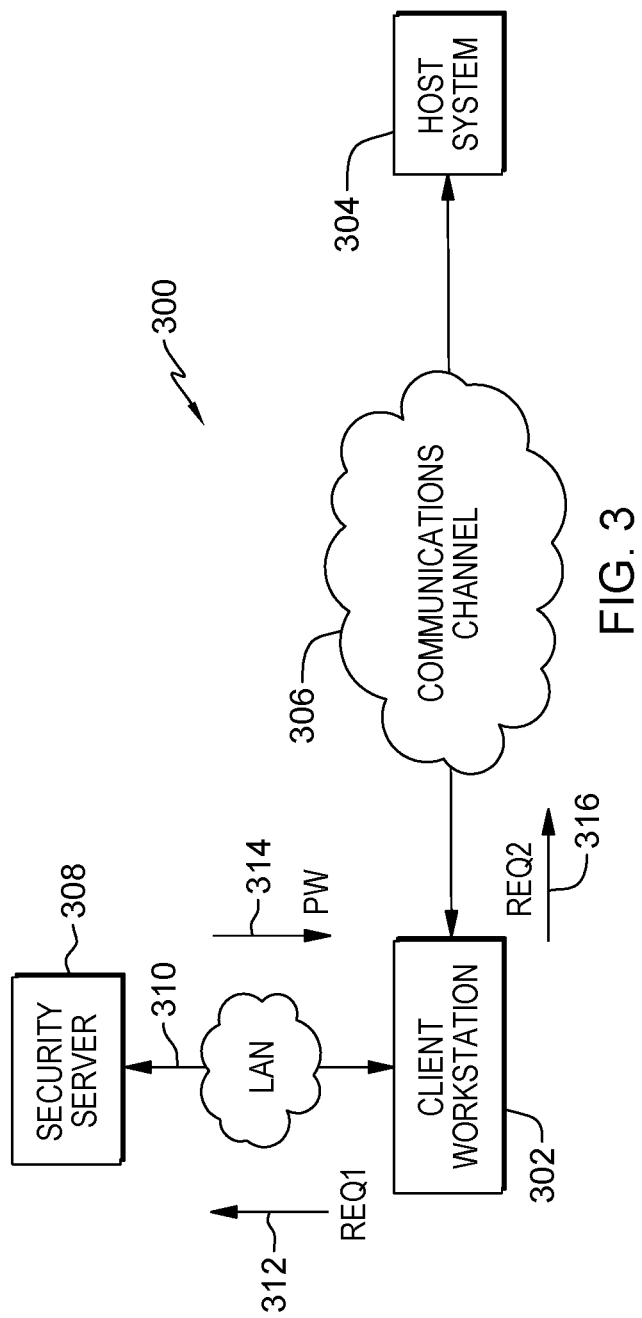

AUTHENTICATION SYSTEM(S) WITH MULTIPLE AUTHENTICATION MODES USING ONE-TIME PASSWORDS OF INCREASED SECURITY

BACKGROUND

Authentication systems for authenticating users to system resources, such as user applications, are well known. Many authentication systems operate by using passwords that are generally known only to the user and the issuer or authenticator. Systems that transmit such passwords over a communications channel from a resource-requesting node are vulnerable to interception of the transmitted passwords by unauthorized entities. Such entities may thereafter attempt to gain access to system resources by using the intercepted passwords together with such non-secret information, such as a user ID, which may also have been intercepted.

To inhibit attempts to gain unauthorized access, passwords are often transmitted over communications channels in encrypted form, so that access to the communications channel does not yield the password itself in plain text form. However, even systems that encrypt passwords before transmission are vulnerable to the possibility that the encrypted password might be recorded and thereafter injected directly into the communications channel (rather than through a terminal and encryption device) to secure the desired access.

To counter this challenge, "one-time" or "dynamic" passwords have been used, that are only valid for a brief time interval (e.g., a minute or less), so that interception of a one-time password during one interval provides no useful information for gaining access to a system during a later interval.

Systems of this type typically generate the one-time passwords as a function of secret information (such as a user password or an encryption key), time-dependent information (such as a time of day (TOD) value or time/date value), and, optionally, non-secret information (such as user ID and application ID). The one-time password is transmitted to the authenticating node where, in one embodiment, it is compared with a comparison password generated in a similar manner using the same secret information and non-secret information, if any, together with a time value available at the authenticating node. If the transmitted password agrees with the comparison password, then the user is authenticated and granted access to the system resource. In another implementation, the necessity for generating a comparison password at the authenticator can be avoided by recovering the original time/date value from the received one-time password for direct comparison with the time/date value available at the authenticating node.

SUMMARY

Certain shortcomings of the prior art are overcome and additional advantages are provided through the provision, in one or more aspects, of a computer program product for authentication processing within an authentication system. The computer program product includes a computer-readable storage medium readable by a processing circuit and storing instruction for performing a method. The method includes generating an authentication parameter as a function of a time-dependent input using a predetermined transformation having an inverse transformation. The time-dependent input is recoverable from the authentication parameter using the inverse transformation, and the authentication system supports multiple authentication modes. A bit-length of the time-dependent input for one authentication mode of the multiple authentication modes is different from a bit-length of the time-dependent input for another authentication mode of the multiple authentication modes. Further, generating the authentication parameter is dependent, in part, on whether the time-dependent input is of the one authentication mode or the other authentication mode. In addition, the method includes generating a time-dependent password including a character string from the authentication parameter using another predetermined transformation having another inverse transformation, where the authentication parameter is recoverable from the time-dependent password using the other inverse transformation, and forwarding the time-dependent password to an authenticator of the authentication system for authentication.

Computer systems and methods relating to one or more aspects are also described and claimed herein. Further, services relating to one or more aspects are also described and can be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1 is a block diagram of one embodiment of an authentication system to use authentication processing in accordance with one or more aspects of the present invention;

FIG. 2 is a more detailed block diagram showing further details of one embodiment of the authentication system of FIG. 1, in accordance with one or more aspects of the present invention;

FIG. 3 is a block diagram of another embodiment of an authentication system, where authentication passwords are generated by a security server, using authentication processing in accordance with one or more aspects of the present invention;

DETAILED DESCRIPTION

Figure 4:
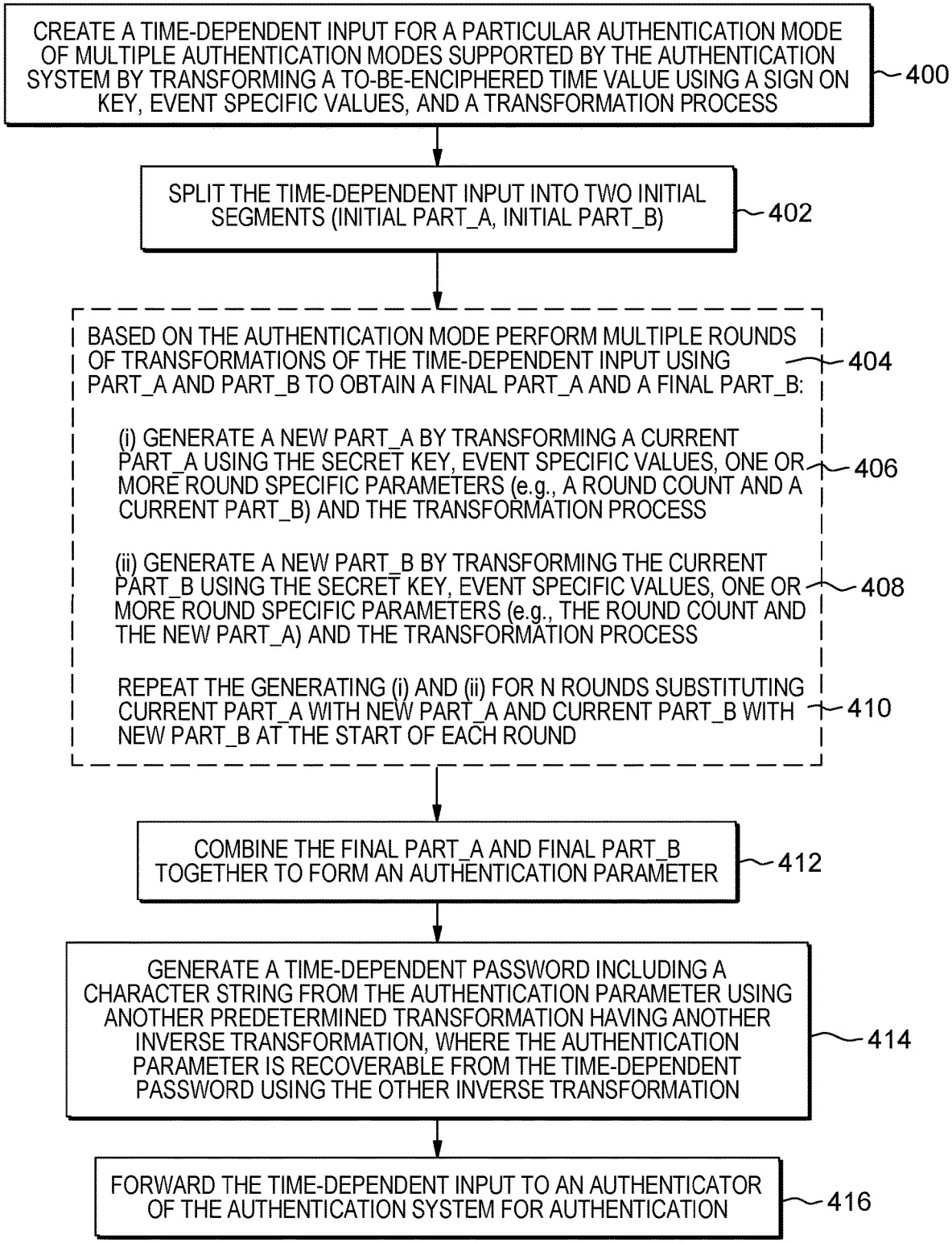
FIG. 4 depicts one process embodiment for enciphering an arbitrary bit-length, time-dependent input to obtain a time-dependent authentication password for forwarding to an authenticator of an authentication system, in accordance with one or more aspects of the present invention.

The accompanying figures, in which like reference numerals refer to identical or functionally similar elements throughout the separate views, and which are incorporated in and form a part of the specification, further illustrate the present invention and, together with the detailed description, serve to explain aspects of the present invention. Note in this regard that descriptions of well-known systems, devices, processing techniques, etc., are omitted so as not to obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of one or more of the concepts disclosed herein.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 8A:
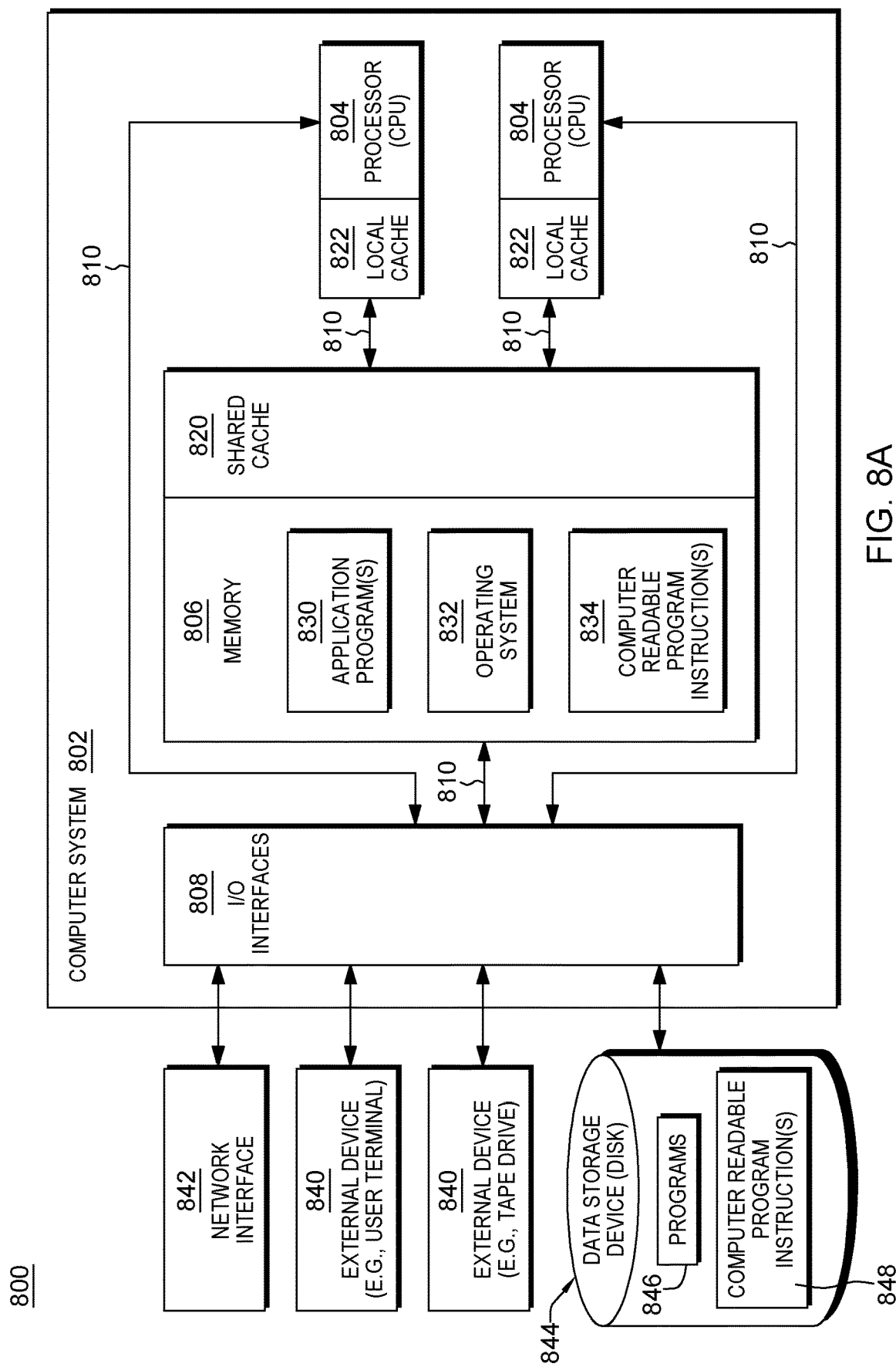
FIG. 8A depicts one example of a computing environment or resource to incorporate and use one or more aspects of the present invention.

As understood by one skilled in the art, program code, as referred to in this application, can include both software and hardware. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 8A as application program(s) 830 and/or computer-readable program instruction(s) 834, stored in memory 806 of computer system 802, as well as programs 846 and computer-readable program instruction(s) 848 stored in a data storage device 844 accessed by computer system 802.

As noted briefly above, an authentication token-based validation system can provide a way for an entity, such as a requesting node, to confirm an identity assertion to an authenticator (or authenticating node). Confirming the identity assertion is by proving possession of a secret sign-on key through the use of an established authentication protocol. Several different protocols exist to generate and evaluate authentication parameters or tokens. In many cases, the authentication parameter generation protocols operate in two main phases. First, a secret key, other known authentication details, and one or more cryptographic processes are used to generate a token binary value, or authentication parameter. The token binary value is then encoded as a character string token value, or authentication password.

A dichotomy exists in that in many types of authentication systems, the authentication credentials are restricted to a certain length and character set, but at the same time, having more possible valid token values introduces more variability and therefore makes identifying or guessing a correct token value more difficult for an attacking entity.

In one or more aspects, disclosed herein is an authentication system with multiple authentication modes in which an authentication parameter (AP) is generated as a function of time-dependent information, such as time of day (TOD) information, using a predetermined (first) transformation. The predetermined transformation has an inverse transformation such that the time-dependent information can be regenerated from the authentication parameter using the inverse transformation. A time-dependent password, including a character string, such as an alphanumeric character string, is generated from the authentication parameter using a predetermined (second) transformation, where this predetermined transformation has an inverse transformation such that the authentication parameter can be regenerated from the password using the inverse transformation.

Note that unless otherwise indicated, reference to an inverse transformation in this context means, not only that the inverse transformation exists, but also that it is computationally feasible to generate. Transformations that have such computational and feasible inverse transformations are said to be "invertible", while those that do not are said to be "non-invertible" or "one-way" transformations or functions.

The password is presented to an authenticator, which can be located at an authenticating node to which the password is transmitted from, for instance, a requesting node. The authenticator regenerates the time-dependent information from the password by regenerating the authentication parameter from the password presented to the authenticator using the inverse of the second transformation, and then by regenerating the time-dependent information from the authentication parameter using the inverse of the first transformation.

The authenticator compares the regenerated time-dependent information with reference time-dependent information and grants access to the resource in accordance with the comparison of the regenerated time-dependent information with the reference time-dependent information. For instance, if the regenerated time value is within a predetermined tolerance of the reference time value, then the authentication request is granted, but otherwise, it is denied. In one or more embodiments, the predetermined tolerance can be system-configurable.

In one or more implementations, the first transformation is a cryptographic transformation using an encryption key shared with the authenticator. The cryptographic transformation is such that the time-dependent information can be regenerated from the authentication parameter and the key, but the key cannot be regenerated from the authentication parameter and the time-dependent information. In such a case, the authenticator regenerates the original time-dependent information by decrypting the regenerated authentication parameter using the decryption key corresponding to the original encryption key. In one or more embodiments, using the disclosed encryption procedures, the encryption key is identical to the corresponding decryption key; however, with other encryption procedures, the encryption key could be different from the corresponding decryption key, although the two would be interrelated.

In one or more embodiments, the authentication parameter is generated by combining the time-dependent information with non-time-dependent information to generate composite information, and encrypting the composite information to generate the authentication parameter. For instance, in one embodiment, the non-time-dependent information can be generated by encrypting non-secret information (e.g., a user ID and/or application name or ID) for an event requiring identifying a request for authentication.

By using an invertible transformation to convert the authentication parameter into a password, the original time-dependent information can be regenerated, and the password can be validated on the basis of only a single comparison, between the regenerated time-dependent information and the reference time-dependent information available at the authenticating node.

Advantageously, in one or more embodiments, the authentication system accommodates different authentication modes. In one mode, referred to herein as UPPER, an m-bit authentication parameter is obtained, while in another approach, referred to herein as MIXED, an n-bit authentication parameter is obtained. In one specific embodiment, m is 41 bits and N is 48 bits. Further, in one embodiment, in the UPPER mode, the secret sign-on key uses uppercase letters and numbers only to produce, for instance, $2^{41}$ possible tokens or parameters, while in the MIXED mode, $2^{48}$ parameters or tokens are possible using, for instance, uppercase and lowercase letters, numbers, and one or more special characters, such as "_" and "-". In one embodiment, the authentication parameter thus has a first plurality of possible values (e.g., $2'$ for an m-bit AP, or $2''$ for an n-bit AP), while the password or other authentication code has a second plurality of possible values (e.g., $36^8$ for a password of 8 uppercase alphanumeric characters) greater than the first plurality of values. Note that reference in this context is without regard to intercharacter constraints that may be imposed by the particular system used to generate the AP or password. An enhanced block encryption procedure described herein, having a m-bit input and output, or a n-bit input and output, is used to generate the desired authentication parameter, depending on the mode being used by the authentication system.

Another aspect of the present invention encompasses a system for transforming (e.g., encrypting or decrypting) an input data block containing x bits into an output data block containing x bits, where x is an even or odd integer. During the transforming, the input data block is first partitioned into first and second (e.g., left and right) bit segments (or parts), where one bit segment can have a different length than the other bit segment. The two bit segments, or parts of the input data block, are subjected to multiple rounds of transformation in which the segments (or parts) are transformed into first and second output segments, serving as the corresponding segments for the subsequent round. Upon completion of the multiple rounds, the final transformed segments (or parts) are recombined to produce the output data block.

Pursuant to one or more aspects described herein, data blocks of any arbitrary size, whether an odd or even number of bits, can be transformed into output data blocks of similar size while preserving all the information in the input block for recovery by an inverse transformation. This is valuable in many situations, such as those described herein, where standard encryption procedures require too large a block size. By using a round specific value on each round, the same key can be used for x-bit encryption on each pass, thereby avoiding the computational load of having to set up a different encryption for each round.

Disclosed herein, in one or more aspects, are new authentication processes for an authentication system which accommodates multiple authentication modes and provides one-time passwords of increased security.

Embodiments of the present invention include a computer program product, a computer system and a method, where program code executing on one or more processors provides authentication processing for an authentication system by generating an authentication parameter as a function of a time-dependent input using a predetermined transformation having an inverse transformation. The time-dependent input is recoverable from the authentication parameter using the inverse transformation. The authentication system supports multiple authentication modes, and a bit-length of the time-dependent input for one authentication mode of the multiple authentication modes is different from a bit-length of the time-dependent input for another authentication mode of the multiple authentication modes. Further, generating the authentication parameter is dependent, in part, on whether the time-dependent input is of the one authentication mode or the other authentication mode. In addition, embodiments of the present invention include program code for generating a time-dependent password including a character string from the authentication parameter using another predetermined transformation having another inverse transformation, where the authentication parameter is recoverable from the time-dependent password using the other inverse transformation. Further, embodiments of the present invention include program code that forward the time-dependent password to an authenticator of the authentication system for authentication, for instance, in association with a requesting event, such as to access a protected application.

In certain embodiments, where the time-dependent input is of the one authentication mode, the time-dependent input is a binary input of an odd or even number of bits, and where the time-dependent input is of the other authentication mode, the time-dependent input is a binary input of a different odd or even number of bits. For instance, in one embodiment, the time-dependent input for the one authentication mode is for an odd number of bits, such as 41-bits, and the time-dependent input for the other authentication mode is for an even number of bits, such as 48-bits, with both modes providing an enhanced number of authentication parameters or tokens in comparison with prior approaches.

In one or more embodiments, program code executing on one or more processors generates the authentication parameter by splitting the time-dependent input into one segment (part_a) and another segment (part_b), and performing multiple rounds of transformation of the one segment (part_a) and the other segment (part_b) to obtain a final part_a and a final part_b. A round of transformation of the multiple rounds of transformation includes transforming a current part_a and a current part_b using, at least in part, a sign-on key, a round-specific value, and a transformation process, with the round-specific value changing with each round of transformation of the multiple rounds of transformation.

Based on performing the multiple rounds of transformation, the final part_a and final part_b are combined to form the authentication parameter.

In one or more embodiments, the one authentication mode is an UPPER authentication mode, where the sign-on key uses uppercase letters and numbers only, and the other authentication mode is a MIXED authentication mode, where the sign-on key uses any of uppercase and lowercase letters, numbers, and one or more special characters.

In one or more implementations, one or more rounds of transformation of the multiple rounds of transformation include a process which depends, in part, on whether the authentication system is currently using the one authentication mode or the other authentication mode.

In certain implementations, during performing the multiple rounds of transformation of part_a and part_b, at least one round of transformation includes generating a new part_a by transforming the current part_a using the current part_b, and generating a new part_b by transforming the current part_b using the new part_a.

In certain embodiments, the round-specific value includes a current value of a round counter, where the current value of the round counter changes with each round of transformation of the multiple rounds of transformation. Further, in one or more embodiments, the transformation process is a message authentication code (MAC) process, such as a hash-based message authentication code (HMAC) process.

In certain embodiments, program code executing on one or more processors regenerates the authentication parameter from the time-dependent password presented to the authenticator using the other inverse transformation, and regenerates the time-dependent input from the authentication parameter using the inverse transformation. Further, program code executing on one or more processors grants access to a resource where the regenerated time-dependent value is within a predetermined tolerance of a reference time-dependent value, otherwise denies access to the resource. In one embodiment, the predetermined tolerance can be configurable for a particular authentication system.

Embodiments of the present invention are inextricably tied to computing and provide significantly more than existing approaches to authentication. For instance, embodiments of the present invention provide program code executing on one or more processors to exploit the interconnectivity of various systems, as well as utilize various computing-centric data analysis and handling techniques, in order to generate an authentication parameter as a function of a time-dependent input using a predetermined transformation having an inverse transformation, where the time-dependent input is recoverable from the authentication parameter using the inverse transformation, and the authentication system supports multiple authentication modes. A bit-length of the time-dependent input for one authentication mode of the multiple authentication modes is different from a bit-length of the time-dependent input of another authentication mode of the multiple authentication modes, and generating the authentication parameter is dependent, in part, on whether the time-dependent input is of the one authentication mode or the other authentication mode. The program code executing on one or more processors further generates a time-dependent password including a character string from the authentication parameter using another predetermined transformation having another inverse transformation, where the authentication parameter is recoverable from the time-dependent password using the other inverse transformation, and forwards the time-dependent password to an authenticator of the authentication system for authentication.

Both the interconnectivity of computing systems or nodes utilized and the computer-exclusive data processing techniques utilized by the program code, enable various aspects of the present invention. Further, embodiments of the present invention provide significantly more than existing approaches to authentication by providing authentication processing with multiple authentication modes and an enhanced number of authentication parameters, as well as by providing encipher and decipher processes applicable to arbitrary-length values, that is, of any bit-length, including even and odd lengths, providing an ability for the authentication system to maximize the quantity of variability in binary token values to accommodate a particular system's restrictive character string set and thereby provide increased security for potential system breach attempts. Further, the authentication processing disclosed herein does not require a nonce value to be secure. The processing disclosed splits the to-be-enciphered value into multiple parts and increases entropy by employing multiple rounds of an enhanced transformation processing on each part before recombining the parts into the final authentication parameter or enciphered value.

In embodiments of the present invention, the program code provides significantly more functionality, including but not limited: 1) program code that generates an authentication parameter as a function of a time-dependent input using a predetermined transformation having an inverse transformation, where the time-dependent input is recoverable from the authentication parameter using the inverse transformation, and the authentication system supports multiple authentication modes, with a bit-length of the time-dependent input for one authentication mode of the multiple authentication modes being different from a bit-length of the time-dependent input for another authentication mode of the multiple authentication modes, and where the generating is dependent, in part, on whether the time-dependent input is of the one authentication mode or the other authentication mode; 2) program code that generates a time-dependent password including a character string from the authentication parameter using another predetermined transformation having another inverse transformation, where the authentication parameter is recoverable from the time-dependent password using the other inverse transformation; and 3) program code that forwards the time-dependent password to an authenticator of the authentication system for authentication.

By way of example, one embodiment of a system 100 to employ one or more aspects of the present invention is depicted in FIG. 1. As illustrated, system 100 includes one entity, such as a requesting node 102, and another entity, such as an authenticating node 104, which are in communication across a communications channel 106 established, for instance, via one or more networks through which requesting node 102 and authenticating node 104 are in communication. Requesting node 102 can execute on, or be, any of a variety of computing resources, environments or devices to be authenticated for communicating with or receiving requested data from authenticating node 104. For instance, requesting node 102 can be a mobile device, a smartphone, a tablet computer, a laptop computer, a personal digital assistant (PDA), a wireless computer, a desktop computer, a server, a workstation, or other computing resource, etc. Further, authenticating node 104 can execute on, or be, any of a variety of computing environments, such as those described herein. In one or more embodiments, authenticating node 104 can be, or execute on, one or more of a variety of computing resources, including, in one or more embodiments, cloud-based computing resources. As noted, requesting node 102 can communicatively couple to authenticating node 104 via a communications channel 106 provided through one or more networks. By way of example only, the one or more networks can include a telecommunications network, a local-area network (LAN), a wide-area network (WAN), such as the Internet, or a combination thereof, and can include wired, wireless, fiber-optic connections, etc. The network can include one or more wired and/or wireless networks that are capable of receiving and transmitting data, including authentication-related data, such as described herein.

Briefly described, in one or more embodiments, the computing resource(s) of requesting node 102 and/or authenticating node 104 can include one or more processors, for instance, central processing unit(s) (CPUs). Also, the processor(s) can include functional components used in the integration of program code, such as functional components to fetch program code from locations in memory, such as cache or main memory, decode program code, and execute program code, access memory for instruction execution, and write results of the executed instructions or code. The processor(s) can include a register(s) to be used by one or more of the functional components. In one or more embodiments, the computing resource(s) can include memory, input/output, a network interface, and storage, which can include and/or access, one or more other computing resources and/or databases, as required to implement the processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the industry standard architecture (ISA), the micro-channel architecture (MCA), the enhanced ISA (EISA), the Video-Electronic Standard Association (VESA), local bus, and peripheral component interconnect (PCI). Examples of a computing resource(s) or a computer system (s) which can implement one or more aspects disclosed herein, are described further below with reference to FIGS. 8A-11.

FIG. 2 depicts a more detailed implementation of an authentication system, in accordance with one or more aspects of the present invention. In this implementation, requesting node 102 is illustrated as containing a one-time password generator 200, which can be implemented as program code executing on a computing resource or machine constituting the requesting node. Alternatively, one or more aspects of password generator 200 can be implemented using special-purpose hardware. Requesting node 102 also includes memory locations for storing, for instance, a user ID (UID) 202 identifying the user, an application ID (AID) 204 identifying the host application being accessed, a sign-on key (K) 206 used as a secret key for the encryptions described herein, and a time/date value (T) 208. As indicated in FIG. 2, values 202-208 provide inputs to password generator 200.

In one embodiment, password generator 200 includes program code executing on one or more computing resources of requesting node 102, which is invoked when a user wishes to access a host application. Further, in one or more embodiments, when invoked, password generator 200 generates a one-time password 210 as a function of, for instance, user ID 202, application ID 204, sign-on key 206, and time/date 208. In one or embodiment, password 210 is transmitted to authenticating node 104, together with user ID 202 and application ID 204, as part of a sign-on request 220.

Authenticating node 104 contains a password evaluator 212 which, similar to password generator 200, can be implemented as program code executing on one or more computing resources of the machine constituting authenticating node 104. Authenticating node 104 also contains, for instance, one or more host applications 218, which can be accessed by a user of requesting node 102 upon presentation of a valid password 210. Password evaluator 212 can be, for instance, separate program code or part of a security software program, such as the IBM Resource Access Control Facility (RACF®) software product. (RACF® is a Trademark of International Business Machines Corporation of Armonk, N.Y. (USA)). Authenticating node 104 stores a copy of sign-on key (K) 214, which is not entrusted to the communications channel 106, as well as a reference time/date (Tref) 216. Password evaluator 212 receives as inputs the local sign-on key 214 and the sign-on request 220 from requesting node 102, which contains the one-time authentication password 210, and the user ID 202. In one or more implementations, the application ID 204 identifying host application 218 can be directly obtained by password evaluator 212 from the host application. In one embodiment, password generator 200 uses these quantities to regenerate the original time/date input 208, which is compared with the reference time/date 216 to determine whether the difference between the two is within a predetermined tolerance (e.g., 10 minutes or less). If so, password evaluator 212 authenticates the user and grants access to the application; otherwise, the evaluator denies access. In either event, password evaluator 212 sends a response 222 to requesting node 102 advising as to the disposition of the sign-on request 220.

FIG. 3 depicts another embodiment of a system 300 implementing one-time access authentication parameters or tokens such as disclosed herein. In the embodiment of FIG. 3, the system is implemented as a client server environment, with the resource requesting functions split between a client workstation 302 and a security server workstation 308. As illustrated, system 300 includes client workstation 302 coupled to authentication node 304 via communications channel 306, and a security server 308 via a local-area network (LAN) 310, in one or more embodiments. Client workstation 302, security server 308, and LAN 310 can be viewed collectively as a single requesting node from the standpoint of authentication node 304. Authentication node 304 and communications channel 306 of system 300 can be similar to the corresponding elements 104 and 106 of system 100. As with requesting node 102 of system 100, client workstation 302 and security server 308 can be, or include or execute on, any of a variety of computing resources or devices such as, for instance, mobile devices, smartphones, tablet computers, laptop computers, personal digital assistants (PDAs), wireless computers, desktop computers, servers, workstations, etc. Further, LAN 310 can be any suitable type of local-area network, such as a token-ring LAN, or the like.

In one authentication sequence embodiment of system 300, a user at client workstation 302 authenticates to LAN 310 by entering, for instance, a LAN security server authentication password, with the method for authenticating the user to LAN 310 being any one of a variety of approaches known in the art, as well as, if desired, an authentication approach such as disclosed herein. After authenticating to LAN 310 and security server 308, a user can access a host application through, for instance, a workstation or client function. A request (REQ1) 312, which contains information identifying the user and the host application being accessed, is sent from client workstation 302 to security server 308 via LAN 310. Security server 308 uses this information, together with time/date information and a sign-on key, to generate a one-time password (PW) such as disclosed herein 314 for accessing the host application. The one-time password 314 is returned through the LAN 310 to client workstation 302, which transmits a sign-on request (REQ2) 316 containing the password together with the user and application information to the authenticating node 304. Authenticating node 304 processes request 316 in a manner similar to authenticating node 104 of FIGS. 1 & 2, in one or more embodiments.

As noted, embodiments of the present invention include computer program products, computer systems and methods for enhanced authentication processing within an authentication system. Aspects described herein provide enhanced processes for enciphering and deciphering values of arbitrary bit-length, including even and odd bit-lengths. This feature is useful in an authentication token system for maximizing total resulting, or enciphered, binary values (e.g., authentication parameters) which can be encoded in an authentication password with a restricted length and a restricted character set for a particular system's authentication credentials. By supporting both even and odd time-dependent length values (via multiple authentication modes), the enhanced authentication processing disclosed herein provides a binary value range closely matching the size of the restricted character string set requirements of the authentication system. Further, the processes disclosed herein do not require a nonce value to be secure. Rather, the to-be-enciphered value is split into multiple parts, and increased entropy is provided by employing multiple rounds of transformation on the different parts before recombining the parts into an enciphered value or authentication parameter.

In one or more embodiments, the authentication processes disclosed herein utilize several input values, including a secret sign-on key, event-specific values (e.g., authentication details, such as a user identity value and an application name identifier), round-count-specific details (such as a round counter value and/or other round-specific transformation data), a transformation process (such as a message authentication code (MAC) process, for instance, a hash-based message authentication code (HMAC)), and a to-be-enciphered value, such as a time-dependent input based on the current time/day. Note that round-specific values, such as the count value of the round counter, are used to ensure that each round-specific transformation produces different results from all other rounds, even where all other inputs are the same.

FIG. 4 illustrates one program code embodiment for generating and forwarding a time-dependent password to an authenticator of an authentication system for authentication, in accordance with one or more aspects of the present invention. The program code generating, or enciphering, can optionally include generating a time-dependent input for a particular authentication mode of multiple authentication modes supported by the authentication system by transforming a to-be-enciphered time value using a secret sign-on key, one or more event-specific values, and a transformation process, such as described herein 400. As described herein, where the time-dependent input is of the one authentication mode, the time-dependent input is a binary number of a first odd or even number of bits, and where the time-dependent input is of the other authentication mode, the time-dependent input is a binary input of a different number of bits (by way of example only). For instance, in one embodiment, the time-dependent input of the one authentication mode is an odd number of bits, and the time-dependent input of the other authentication mode is an even number of bits. Thus, the time-dependent input can be a binary number of an odd or even number of bits, depending on the authentication mode currently used by the authentication system. In one specific example described herein, the time-dependent input of the one authentication mode includes 41-bits, and the time-dependent input of the other authentication mode includes 48-bits. Those skilled in the art will note, however, that these bit numbers are provided by way of example only.

As shown, the time-dependent input or initial binary package, is split (in one embodiment) into two segments, referred to herein as part_a and part_b 402. Advantageously, as disclosed herein, the time-dependent input can be split into segments (or parts) of equal or unequal length.

Based on the authentication mode, multiple rounds of transformation of the time-dependent input are performed using part_a and part_b to obtain a final part_a and a final part_b 404. The multiple rounds of transformation can include for each round: (i) generating a new part_a by transforming a current part_a using the secret sign-on key, one or more event-specific values, one or more round-specific parameters (e.g., a round count and/or a current part_b), and the transformation process 406; (ii) generating a new part_b by transforming the current part_b using the secret sign-on key, one or more event-specific values, one or more round-specific parameters (e.g., the round count and/or new part_a), and the transformation process 408. The generating (i) and the generating (ii) are repeated for N rounds, substituting the current part_a with new part_a, and the current part_b with new part_b at the start of each round 410. Note that the number of rounds of transformation can be configurable for a particular authentication system.

The final part_a and final part_b are combined together to form an authentication parameter 412, or enciphered binary value, of the same number of bits as the time-dependent input. The authentication parameter is encoded into a character string token value of an acceptable length and character set for the target system (e.g., authenticating node) 414. In particular, a time-dependent password is generated, including a character string, from the authentication parameter using another predetermined transformation having an inverse transformation, where the authentication parameter is recoverable from the time-dependent password using the inverse transformation. The time-dependent password is then forwarded to an authenticator of the authentication system for authentication 416.

Note that the processing of FIG. 4 illustrates one embodiment only for enciphering, for instance, an arbitrary bit-length plain text value in accordance with the concepts disclosed herein.

Figure 5:
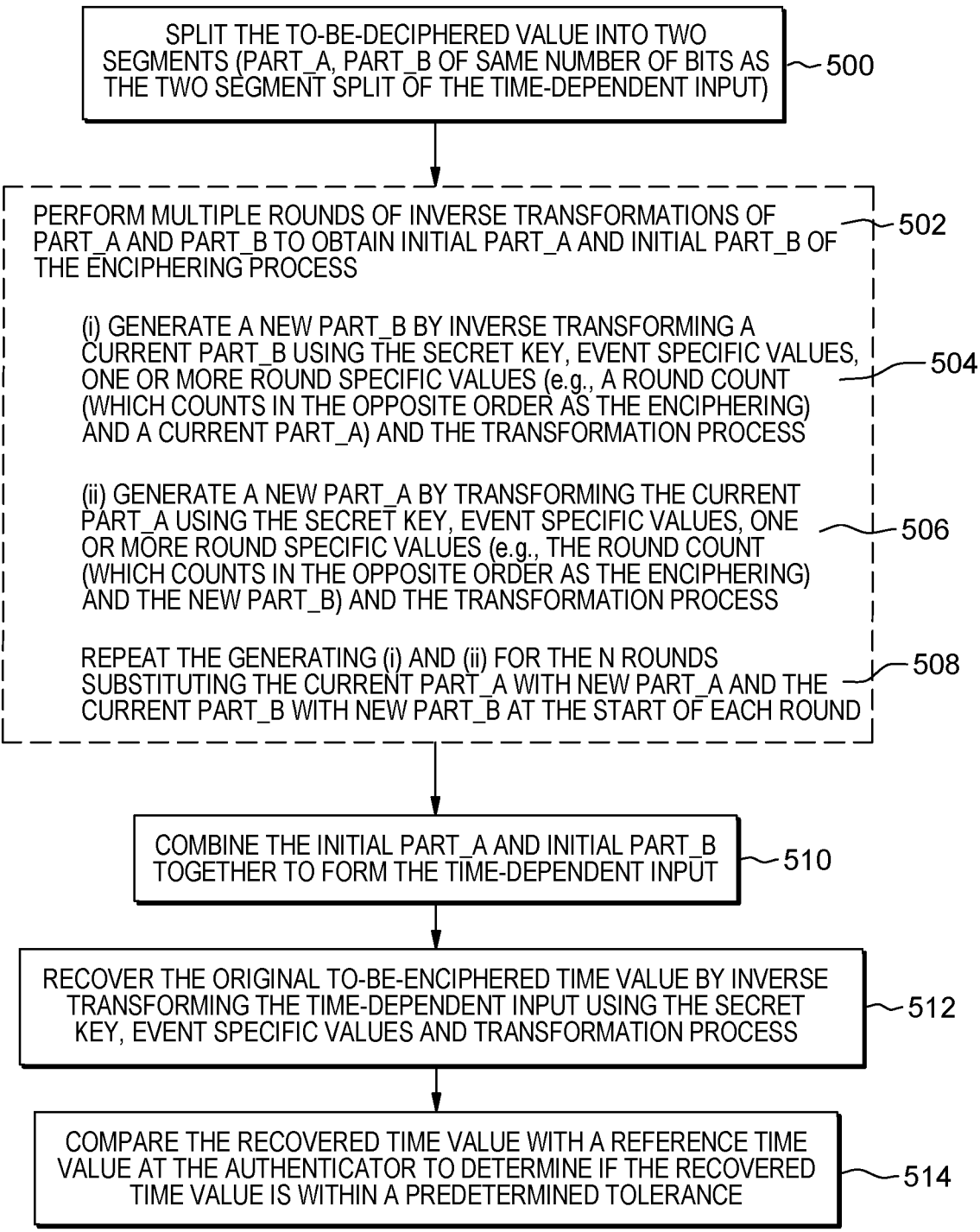
FIG. 5 depicts one process embodiment for evaluating a time-dependent authentication password, where the original time value input to the enciphering process of FIG. 4 is recovered for comparison with a reference-time value, in accordance with one or more aspects of the present invention.

FIG. 5 illustrates one process embodiment for evaluating an authentication password, such as generated using the processing of FIG. 4. The evaluating process includes deciphering the authentication password, which as noted, can be based on an arbitrary bit-length enciphered value obtained using generating processing such as described herein.

The evaluation process of FIG. 5 assumes that the inverse transformation of the authentication password to the authentication parameter has already occurred, leaving the authentication parameter as the to-be-deciphered value. For instance, in one or more embodiments, the authentication password, or character string token value, is initially decoded or inverse-transformed into the authentication parameter (or enciphered binary value that is the to-be-deciphered value). As shown, the to-be-deciphered value, i.e., authentication parameter, is split into two segments (part_a, part_b) of the same number of bits as the two segments (initial part_a, initial part_b) that the time-dependent input was initially split into during the enciphering process 500, which as noted, can be of equal or unequal lengths.

Multiple rounds of back transformation of part_a and part_b are performed to obtain the initial part_a and the initial part_b of the enciphering process 502. The multiple rounds of back transformation include: (i) generating a new part_b by transforming a current part_b using the secret sign-on key, one or more event-specific values, one or more round-specific values (e.g., a round count (which counts in the opposite order as for the enciphering) and a current part_a), and the transformation process 504; (ii) generating a new part_a by transforming the current part_a using the secret sign-on key, one or more event-specific values, one or more round-specific values (e.g., the round count (which counts in the opposite order as for the enciphering) and a new part_b), and the transformation process 506. The generating (i) and the generating (ii) are repeated for the N rounds, substituting the current part_a with new part_a, and the current part_b with new part_b at the start of each round 508. Based on performing the multiple rounds of back transformation, the initial part_a and the initial part_b are obtained and combined together to form the time-dependent input 510. The original to-be-enciphered time value can then be recovered by back transforming the time-dependent input using the secret sign-on key, the one or more event-specific values, and transformation process 512. Once obtained, the recovered time value is compared with a reference-time value at the authenticator to determine if the recovered time value is within a predetermined tolerance 514 (e.g, within a predefined number of minutes or seconds).

FIGS. 6A-7B illustrate a more detailed program code embodiment for password generation and password evaluation, in accordance with one or more implementations of the present invention.

In one embodiment, the process uses multiple inputs, including in one embodiment, a host user ID, such as a RACF® host user ID, a secret sign-on key, which can be mode and application-dependent, an application name, time and date information, and the coding or transformation process type. For instance, the user ID identifies the user on the authentication system on which the target application executes or runs. The user ID, in one implementation, can be represented in extended binary-coded decimal interchange code (EBCDIC), and can be left-justified and padded with blanks on the right to extend to a length of 8 bytes (in one embodiment). The sign-on key is a secret application key value appropriate for the authentication mode currently configured for the authentication system. In one or more embodiments, the secret key is an HMAC secret key, which can be of a variable number of bits. In one implementation, HMAC with SHA-512 is used, along with 256-bit through 2048-bit HMAC keys. However, other platforms or implementations can have other support or restrictions for HMAC. In one embodiment, HMAC secret keys are used in both the UPPER authentication mode and the MIXED authentication mode.

The application name is defined for a particular application, and can be used to associate the secret sign-on key with a particular host application. By way of example, further details about determining application names are described in the z/OS Security Server RACF® Security Administrator's Guide, published by International Business Machines Corporation of Armonk, N.Y. (USA). In one implementation, the application name (or ID) is represented in EBCDIC and is left-justified and padded with blanks on the right side to a length of 8 bytes (by way of example only). Note that the user ID and application ID are in text form (typically ASCII or EBCDIC, depending on implementation) when used by the password generator. In one embodiment, different matching sign-on keys are used for each host application being accessed. To facilitate this, the sign-on keys can be stored in a table (not shown) where they are accessed, for instance, using the application ID.

The time/date information (together with the reference time/date generated by the authenticating node) indicates the number of time intervals of specified duration that have elapsed on a predefined start time. In one embodiment, the time/data information represents the number of seconds that have elapsed since Jan. 1, 1970, at 00:00 GMT. (The term "time/date" is used because the value as a whole indicates both the time of day (TOD) and the date; there are no separate fields for these two quantities.) The time/date input for the one authentication mode is a 41-bit binary integer (for UPPER mode) derived using a time macro or comparable programming function to obtain the time from the clock on the machine located at the node in question. For the other authentication mode, the time/date information is a 48-bit binary integer (for MIXED mode). Various programming languages support a function for representing time in this way. For example, in the C language, time in the required format could be obtained by the following code. Assuming variable "ts" is declared as "long", then invoking the function time (&ts) will return in variable "ts" the number of seconds expired since Jan. 1, 1970, at 00:00 GMT expressed as an unsigned long integer.

Note that it is likely that the computer or authenticating node that authenticates the time-dependent password is not the computer or requesting node that generated the password. To provide for differences in internal clocks, the processing disclosed herein allows the generated time to be different than the TOD clock of the authenticator or authenticating node that is evaluating the time-dependent password. The amount of variation or time skew allowed can be configurable within the authentication system. In one embodiment, for the time-dependent password to be evaluated, the TOD clock should be set to GMT, rather than local time.

Figure 6A:
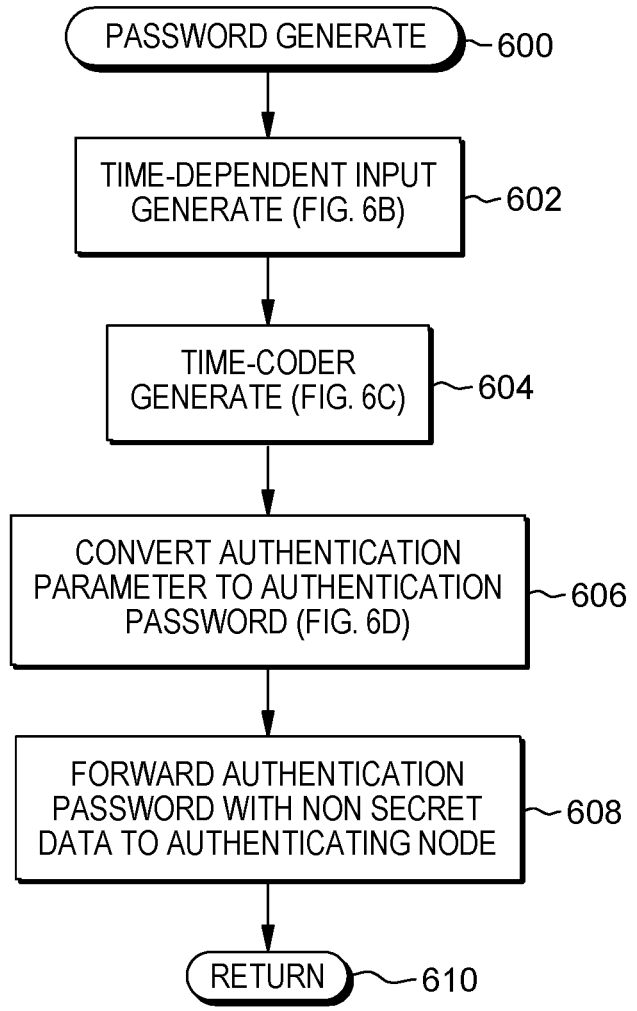
FIGS. 6A-6D depict a more detailed embodiment of an enciphering process for generating a time-dependent authentication password for forwarding to an authenticator, in accordance with one or more aspects of the present invention.
Figure 6B:
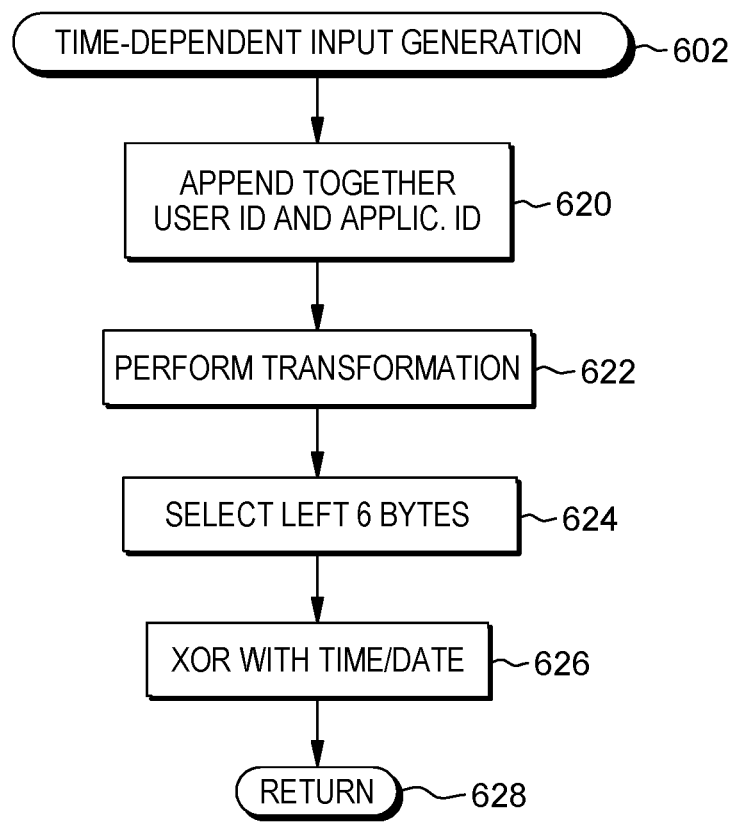
Figure 6C:
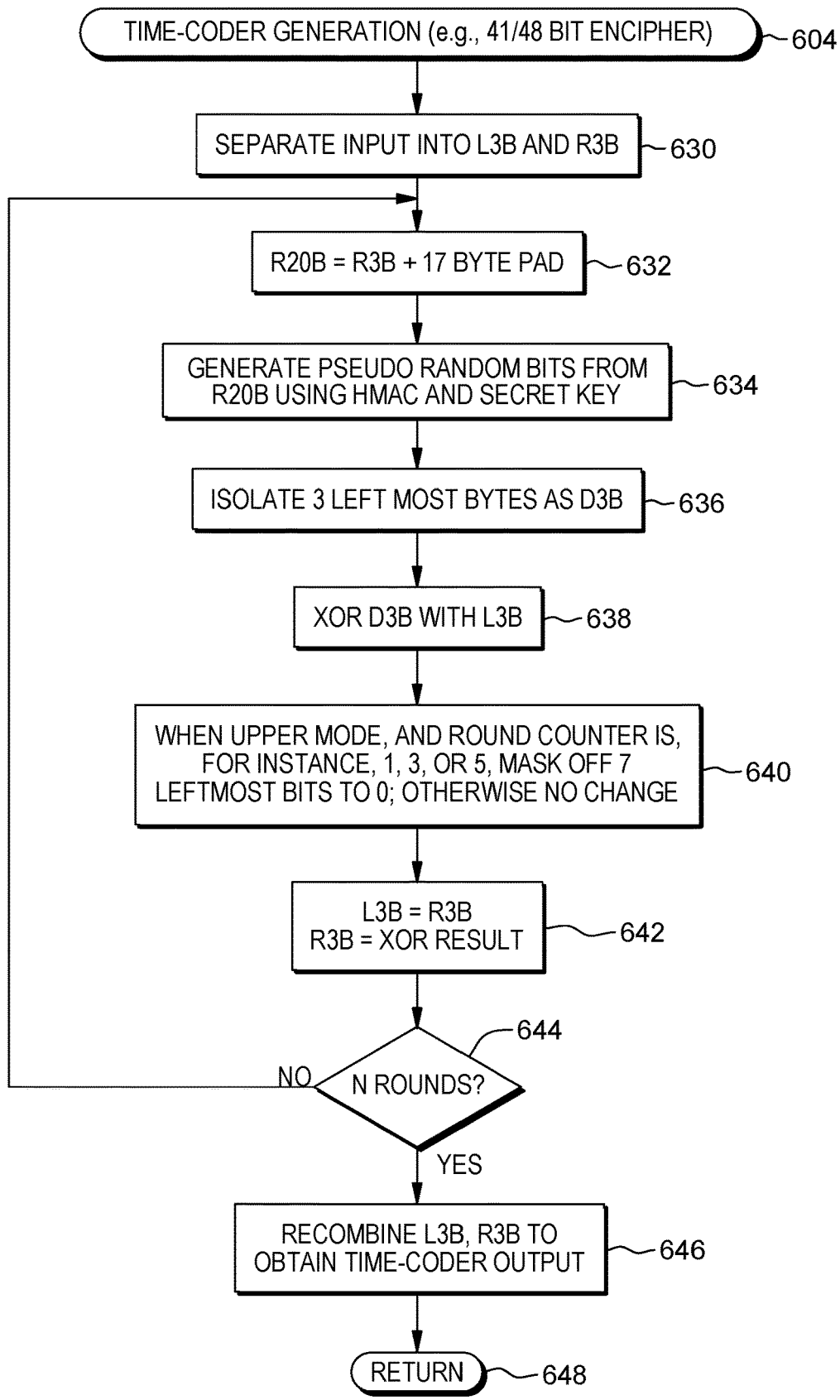
Figure 6D:
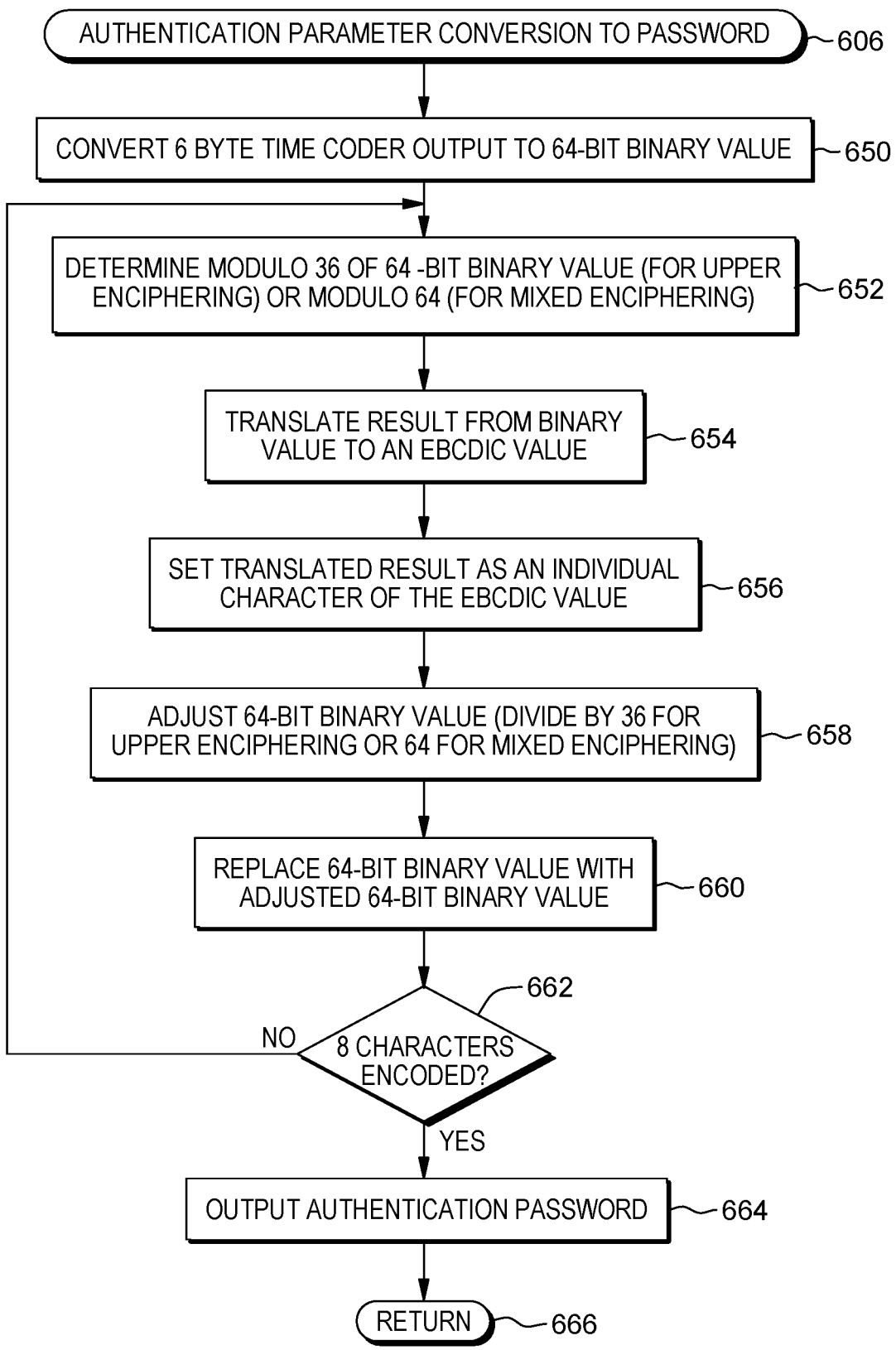

By way of further example, FIGS. 6A-6D depict in greater detail one program code embodiment for generating an authentication password, in accordance with one or more implementations. FIG. 6A depicts an overview of the authentication password process 600, which includes optionally generating the time-dependent input 602, one embodiment of which is described below with reference to FIG. 6B. The time-dependent input is transformed into an authentication parameter, via a time-coder generate process 604, one embodiment of which is depicted in FIG. 6C and described below. Once obtained, the authentication parameter is converted to an authentication password by an encoding process 606, one embodiment of which is depicted in FIG. 6D and described below. The authentication password is forwarded, along with associated non-secret data, such as the user ID and application ID, in one or more implementations, to the authenticator of the authenticating node 608, after which processing returns 610.

As noted, FIG. 6B depicts one program code embodiment for generating a time-dependent input 602 to be transformed into an authentication parameter as described herein. In the embodiment illustrated, the user ID and application ID are appended together to produce composite information (result 1) 620. The composite information is transformed using, for instance, a transformation process such as HMAC. In one embodiment, HMAC processing using the secret sign-on key is performed on the composite information to produce transformed composite information (result 2). Note that in one implementation, the cryptographic operations employed can use HMAC with SHA-512, which produces 64 bytes of output. In the embodiment of FIG. 6B, the left 6 bytes of the transformed information are selected, and the rest discarded 624. The selected bytes are transformed by applying an exclusive OR operation with the time/date information to produce the time-dependent input 626 of the desired number of bits for the particular mode. After that, program code returns to, for instance, continue with the time-coder generation processing 604 (FIG. 6A).

By way of example, FIG. 6C depicts one embodiment of a program code encipherment process or routine, which involves a number of iterations or "rounds". The processing is generally referred to as the time-coder generation processing, and results in output of an authentication parameter. As illustrated, in one embodiment, the 6-byte time-dependent input is separated into two segments, a part_a, referred to as L3B (i.e., the left-three bytes), and a part_b, referred to as R3B (i.e., the right-three bytes) in this embodiment 630. Seventeen bytes are concatenated with the part_b (R3B) to produce a resulting 20-byte string (R20B), with the 3-bytes of R3B occupying the leftmost 3-byte positions. In one implementation, the padding is a 17-byte string containing separate fields including, for instance, a 1-byte round counter (where the round counter starts with a value 1 for the first iteration and is incremented by 1 after each round), an 8-byte user ID, and an 8-byte application name or ID. Note that STEP 632 is a first step in a loop including STEPS 632-644 that is performed N times (referred to as "rounds" herein). In one example, N=6, and in each round, part_a (L3B) and part_b (R3B) are subject to various operations, before the resultant parts are recombined into the authentication parameter output.

As illustrated, pseudorandom bits are generated from the result R20B using, in one embodiment, HMAC, and the secret sign-on key as the HMAC key 634 to produce a pseudorandom product. The leftmost 3-bytes of the product are isolated as D3B 636, with the rest of the value being discarded.

The resultant D3B of STEP 636 is then combined with part_a (L3B), using the exclusive OR (XOR), or modulo-2 addition, operation 638, to complete the encryption process. Where the authentication mode is UPPER, and the round counter is, for instance, 1, 3 or 5, a masking operation is performed. In particular, the leftmost 7-bits of the XOR result of STEP 638 are masked-off to change their value to 0. Otherwise, where the authentication mode is UPPER and the round counter is 2, 4 or 6, or the authentication mode is MIXED, the XOR result is passed unchanged 640. Next, the current part_a (L3B) is set equal to the current part_b (R3B), producing a new part_a, and the new part_b is set equal to the result of the XOR operation 642. A test is made of the number of rounds that have been completed 644. For instance, where N equals 6, if the count value is less than 6, processing returns to STEP 632 for another round. If the N rounds have been completed, then processing continues with STEP 646, by recombining the final part_a and final part_b to obtain the time-coder output, i.e., the authentication parameter 646, before processing returns 648 to, for instance, the processing of FIG. 6A, for translation of the authentication parameter into the authentication password.

As noted, once obtained, the authentication parameter is converted into an authentication password. In one or more implementations, the process uses a translation table consisting of 64 slots. The first 10 slots are occupied by the numbers 0-9, and the next 26 slots are occupied by the uppercase letters of the alphabet (A-Z). The next 26 slots are occupied by the lowercase letters of the alphabet (a-z). In one embodiment, the last two slots can be occupied by two special characters (such as, "-" and "_". An embodiment of this depicted in Table 1 below.

TABLE 1

| 0  | 1  | 2  | 3  | 4  | 5  | 6  | 7  | 8  | 9  | 10 | 11 | 12 | 13 | 14 | 15 |
|----|----|----|----|----|----|----|----|----|----|----|----|----|----|----|----|
| 0  | 1  | 2  | 3  | 4  | 5  | 6  | 7  | 8  | 9  | A  | B  | C  | D  | E  | F  |
| 16 | 17 | 18 | 19 | 20 | 21 | 22 | 23 | 24 | 25 | 26 | 27 | 28 | 29 | 30 | 31 |
| G  | H  | I  | J  | K  | L  | M  | N  | O  | P  | Q  | R  | S  | T  | U  | V  |
| 32 | 33 | 34 | 35 | 36 | 37 | 38 | 39 | 40 | 41 | 42 | 43 | 44 | 45 | 46 | 47 |
| W  | X  | Y  | Z  | a  | b  | c  | d  | e  | f  | g  | h  | i  | j  | k  | l  |
| 48 | 49 | 50 | 51 | 52 | 53 | 54 | 55 | 56 | 57 | 58 | 59 | 60 | 61 | 62 | 63 |
| m  | n  | o  | p  | q  | r  | s  | t  | u  | v  | w  | x  | y  | z  | -  | _  |

Note that an authentication parameter for the UPPER authentication mode will only use the first 36 slots (0-35) of the translation table, while an authentication parameter for the MIXED mode can use all 64 slots.

As shown in FIG. 6D, authentication parameter conversion to an authentication password 606 can involve program code converting the time-coder generation output to an EBCDIC string value by first converting the 6-byte time-coder output to a 64-bit binary value 650.

A loop is then entered including STEPS 652-662, where processing is repeated for generating each character of 8 characters to be encoded. As illustrated, for the UPPER authentication mode, a modulo 36 is determined for the 64-bit binary value (for UPPER mode enciphering), or a modulo 64 is determined for the 64-bit binary value for MIXED mode enciphering 652. In a next step, the result is translated from binary value to EBCDIC value (by way of example) using the translation table, such as translation Table 1 654. For instance, the binary value 33 is translated to the EBCDIC value "X".

The translated result is set as an individual character of the EBCDIC value 656. The characters are concatenated together one at a time, starting with the rightmost character and proceeding to the left on each round of conversion.

The 64-bit binary value is adjusted (divide by 36 for UPPER enciphering, or 64 for MIXED enciphering) 658, and the adjusted 64-bit binary value is used in place of the 64-bit binary value 660. STEP 662 determines whether the desired number of characters have been encoded, which is 8 in the example of FIG. 6D. Where there are less than 8 characters encoded, the conversion process returns to STEP 652 for another round. Once 8 characters have been encoded, the authentication password value 664 has been assembled, and processing returns 666, for instance, to the overview code process of FIG. 6A.

Figure 7A:
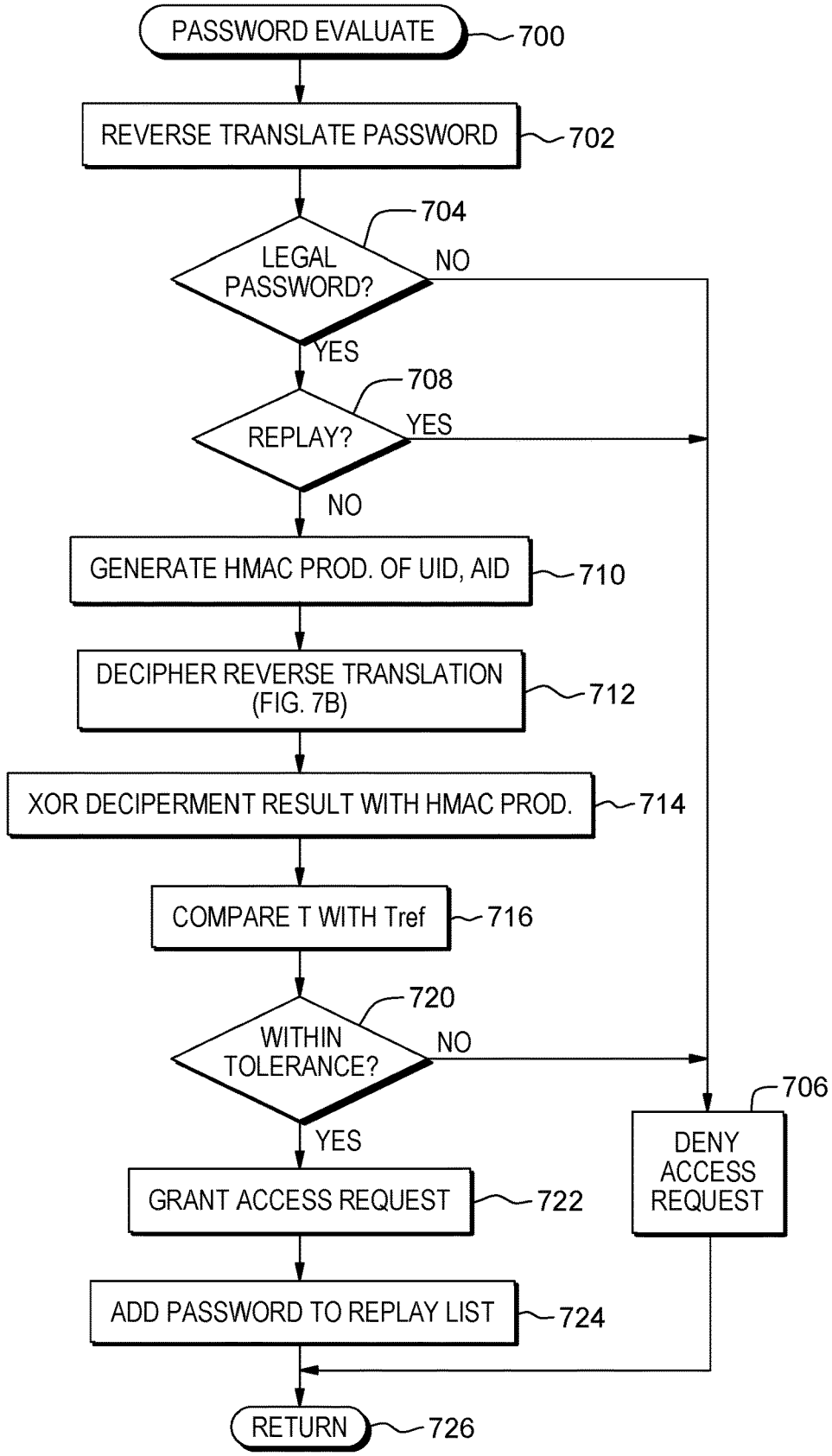
FIGS. 7A-7B depict a more detailed embodiment of an evaluation process for evaluating a time-dependent authentication password generated via the enciphering process of FIGS. 6A-6D, in accordance with one or more aspects of the present invention.
Figure 7B:
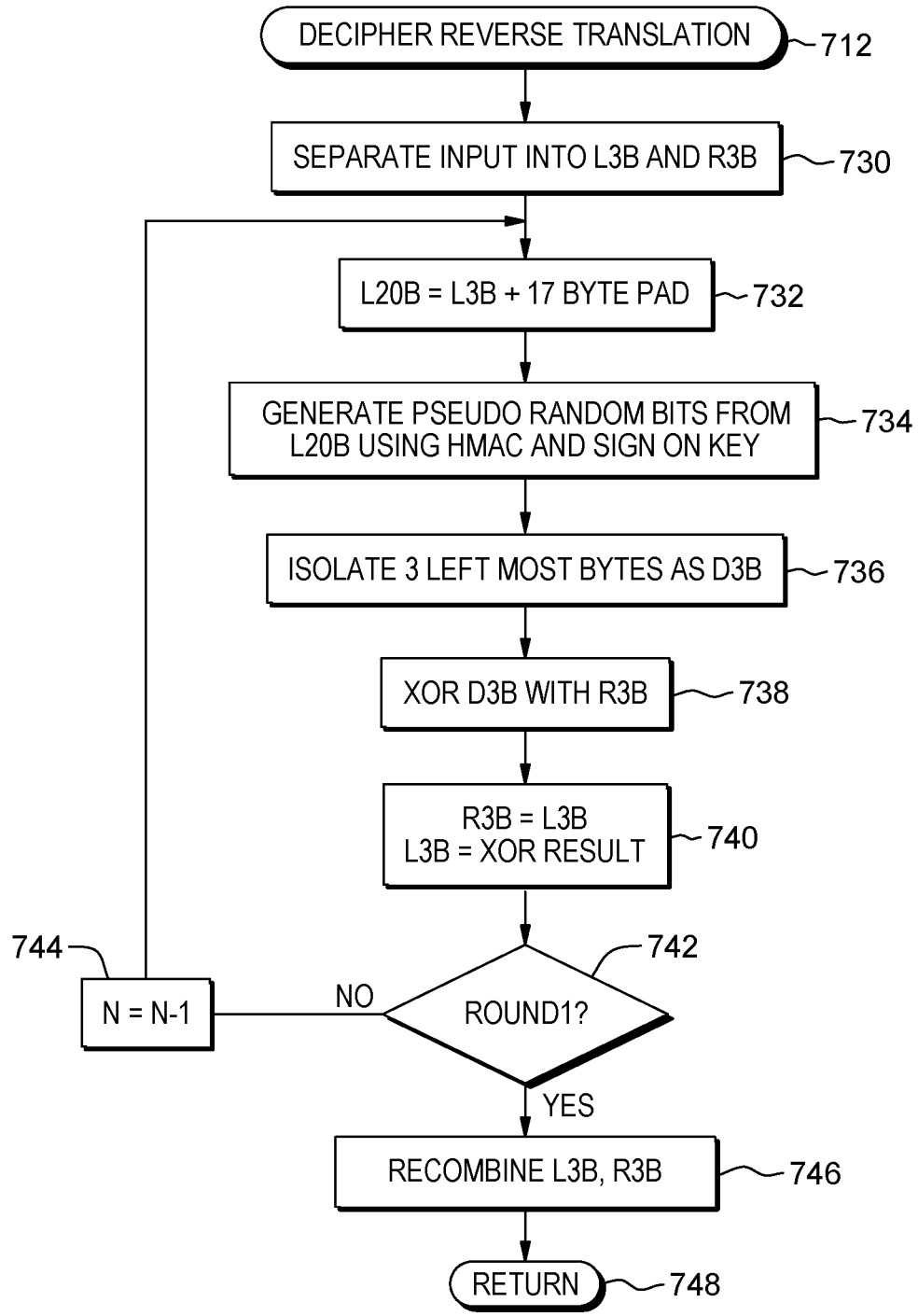

FIGS. 7A-7B depict a more detailed embodiment of a program code evaluation process for evaluating a time-dependent authentication password generated via the enciphering process of FIGS. 6A-6D.

FIG. 7A depicts one embodiment of code processing implemented by the password evaluator at the authentication node to evaluate, for instance, an authentication request containing a one-time password, a user ID and an application ID received from a requesting node.

Upon receiving a sign-on request containing a one-time password, the password evaluator can first attempt to reverse-translate the password 702. The attempt results in the regeneration of the authentication parameter if the received password corresponds to a legal password, i.e., a password that could have been generated from the value of the authentication parameter input into the password translation routine. If the reverse-translation procedure determines that the received password does not correspond to a legal password 704, then the password evaluator denies access 706 without further processing, since the received password represents either an attempt to break into the system or a corruption of data.

Based on the received password corresponding to a legal password, then the password evaluator determines whether the received password is identical to a valid password recently received over a predefined time interval 708. If the received password is a repeat or replay of a prior-processed password within the defined time interval, then the just-received password is rejected as a "replay" of the previously-received password 706. Since the valid password for a given user ID and application ID changes with time, the only realistic manner in which an identical password can be generated is by interception of a previously transmitted password (e.g., as it traverses the communications channel) and "replay" of that password by injecting it back into the authentication system.

Where the received password is not a replay of a previously generated password, the password evaluator proceeds to generate an encryption product in a manner similar to the generation of the corresponding product by the password generator, except that the key used is the sign-on key stored at the authenticating node, as well as the received user ID and application ID 710.

The regenerated authentication parameter is passed to a decipherment routine, one embodiment of which is depicted in FIG. 7B, for reverse-translating the parameter 712. The reverse-translation of the authentication parameter converts the parameter to a decrypted m-bit or n-bit quantity corresponding to the time-dependent input. The decipherment result is then combined with the encryption product (HMAC product), using an XOR operation to generate a time/date value T 714.

The regenerated time T is compared with the reference time/date value Tref generated locally by the authentication node using a suitable comparison routine 716. If the regenerated value T is outside a predetermined tolerance (e.g., +/−x minutes) of Tref 720, then the password evaluator denies access 706, since the password does not correspond to a valid time period.

If the regenerated value T is within the predetermined tolerance, then the evaluator validates the requestor and grants the request for access to the host application 722. In addition, the validated password is added to a queue of comparison passwords for replay detection 724. Validated passwords are added to the queue in order of their generation time T (as maintained by the particular requesting node) rather than their arrival time as indicated by the host time Tref (which can be different from T). They are purged from the queue when their generation time T falls more than a present number of minutes behind the current host time Tref, since by that time, they are stale and cannot be successfully replayed into the system. This purging can occur upon the validation of a password (after STEP 720), as well as just prior to checking the queue for a reused password (at STEP 708).

FIG. 7B depicts one embodiment of a program deciphering routine for reverse-translation 712. Upon entering the routine, the input is divided into one segment, part_a (L3B) and another segment, part_b (R3B) 730. Processing then performs N iterations ("rounds") of a loop including STEPS 732-742, in which part_a and part_b are subjected to various operations before recombining the parts and exiting the decipherment routine.

On each round, part_a (L3B) is concatenated with 17-bytes of padding bits 732 consisting of the round counter, user ID and application ID, as in the encipherment process. In the resultant L20B output, the 3-bytes of L3B occupy the leftmost 3-byte positions. An HMAC with SHA-512 is performed on the L20B result, with the authentication copy of the secure sign-on key 734 as the HMAC key, to produce a pseudorandom product. The leftmost 3-bytes of the pseudorandom product are isolated 736 as D3B, and the rightmost bytes outside of D3B are discarded. The resultant D3B is combined with R3B using the XOR (modulo-2-addition) operation 738. The current part_b is then set equal to the current part_a (L3B), after which the current part_a is set equal to the result of the XOR operation 740.

In STEP 742, a test is made of the number of rounds that have been completed. If the value is yet to reach 1, the decipherment process continues for another round, by subtracting 1 from the current round number 744 before repeating the loop. If 6 rounds have been completed, that is, the round count has countdown to 1, then the resultant part_a (L3B) and part_b (R3B) are combined into a corresponding bit-string for the authentication mode, completing the process 746, after which processing returns 748.

One embodiment of a computing environment to incorporate and use one or more aspects of the present invention is described with reference to FIG. 8A. In one example, the computing environment is based on the z/Architecture hardware architecture, offered by International Business Machines Corporation, Armonk, N.Y. One embodiment of the z/Architecture hardware architecture is described in "z/Architecture Principles of Operation," IBM Publication No. SA22-7832-12, Thirteenth Edition, September 2019, which is hereby incorporated herein by reference in its entirety. IBM and Z/ARCHITECTURE are registered trademarks of International Business Machines Corporation in at least one jurisdiction.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 8A, a computing environment 800 includes, for instance, a computer system 802 shown, e.g., in the form of a general-purpose computing device. Computer system 802 may include, but is not limited to, one or more processors or processing units 804 (e.g., central processing units (CPUs)), a memory 806 (referred to as main memory or storage, as examples), and one or more input/output (I/O) interfaces 808, coupled to one another via one or more buses and/or other connections 810.

Bus 810 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 806 can include, for instance, a cache 820, such as a shared cache, which can be coupled to local caches 822 of processors 804. Further, memory 806 can include one or more programs or applications 830, an operating system 832, and one or more computer readable program instructions 834. Computer readable program instructions 834 can be configured to carry out functions of embodiments of aspects of the invention.

Computer system 802 can also communicate via, e.g., I/O interfaces 808 with one or more external devices 840, one or more network interfaces 842, and/or one or more data storage devices 844. Example external devices include a user terminal, a tape drive, a pointing device, a display, etc. Network interface 842 enables computer system 802 to communicate with one or more networks, such as a local-area network (LAN), a general wide-area network (WAN), and/or a public network (e.g., the Internet), providing communication with other computing devices or systems.

Data storage device 844 can store one or more programs 846, one or more computer readable program instructions 848, and/or data, etc. The computer readable program instructions can be configured to carry out functions of embodiments of aspects of the invention.

Computer system 802 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 802. Examples, include, but are not limited to: microcode, device drivers, redundant processing units, external disk drive arrays, RAID systems, tape drives, and data archival storage systems, etc.

Computer system 802 can be operational with numerous other general purpose or special purpose computing system environments or configurations. Examples of well-known computing systems, environments, and/or configurations that may be suitable for use with computer system 802 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 8B:
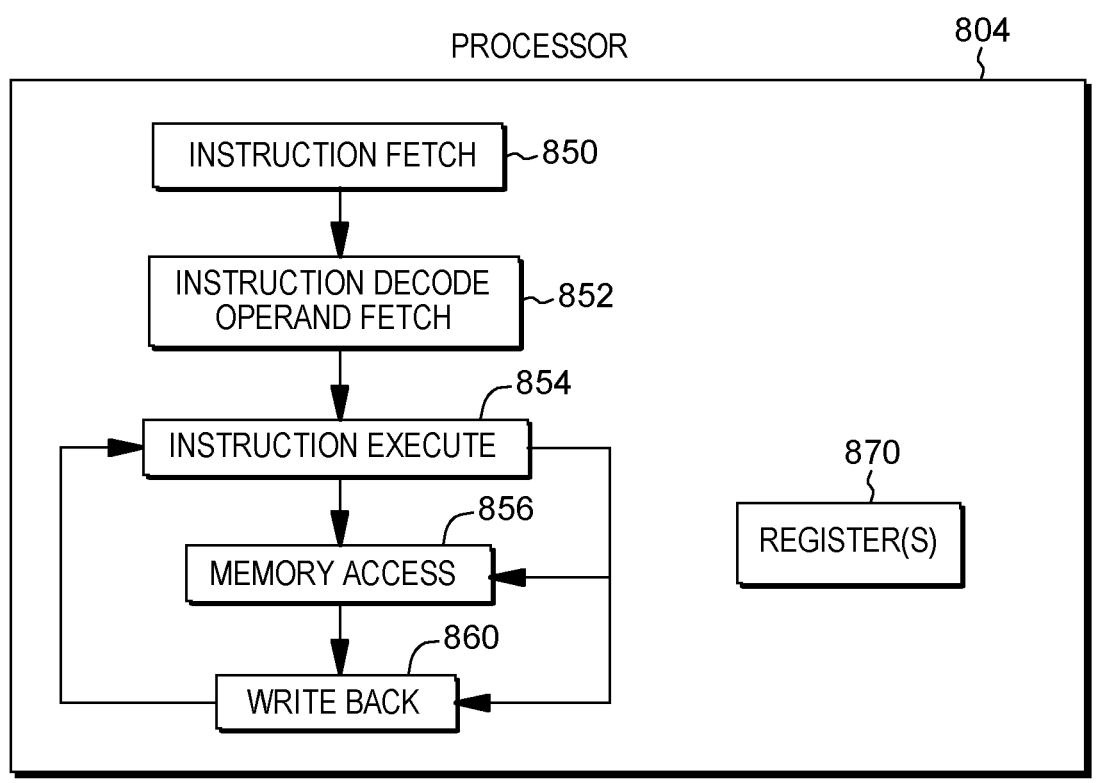
FIG. 8B depicts further details of the processor of FIG. 8A, in accordance with an aspect of the present invention.

Further details regarding one example of processor 804 are described with reference to FIG. 8B. Processor 804 includes a plurality of functional components used to execute instructions. These functional components include, for instance, an instruction fetch component 850 to fetch instructions to be executed; an instruction decode unit 852 to decode the fetched instructions and to obtain operands of the decoded instructions; instruction execution components 854 to execute the decoded instructions; a memory access component 856 to access memory for instruction execution, if necessary; and a write back component 860 to provide the results of the executed instructions. Processor 804 also includes, in one embodiment, one or more registers 870 to be used by one or more of the functional components.

Figure 9A:
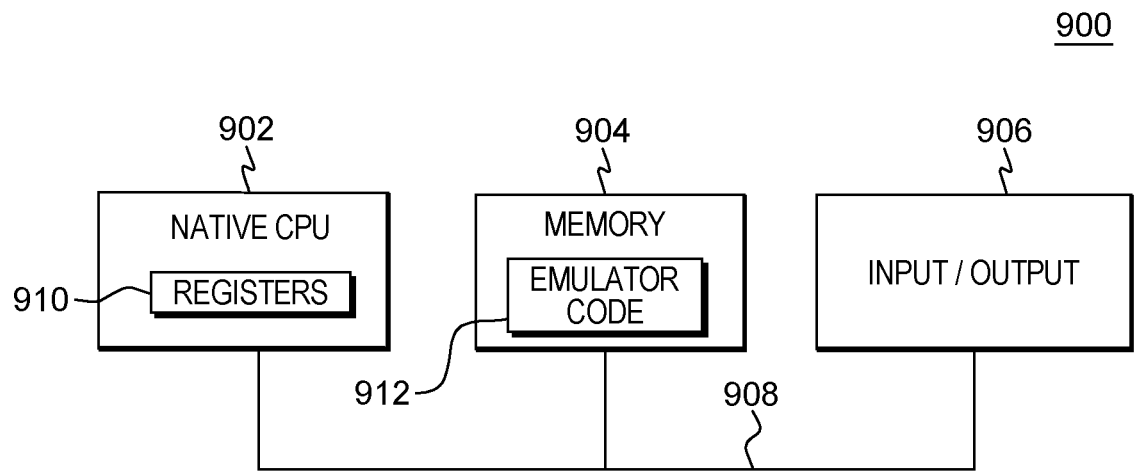
FIG. 9A depicts another example of a computing environment or resource to incorporate and use one or more aspects of the present invention.

Another embodiment of a computing environment to incorporate and use one or more aspects is described with reference to FIG. 9A. In this example, a computing environment 900 includes, for instance, a native central processing unit (CPU) 902, a memory 904, and one or more input/output devices and/or interfaces 906 coupled to one another via, for example, one or more buses 908 and/or other connections. As examples, computing environment 900 may include a PowerPC processor or a pSeries server offered by International Business Machines Corporation, Armonk, N.Y.; and/or other machines based on architectures offered by International Business Machines Corporation, Intel, or other companies.

Native central processing unit 902 includes one or more native registers 910, such as one or more general purpose registers and/or one or more special purpose registers used during processing within the environment. These registers include information that represents the state of the environment at any particular point in time.

Moreover, native central processing unit 902 executes instructions and code that are stored in memory 904. In one particular example, the central processing unit executes emulator code 912 stored in memory 904. This code enables the computing environment configured in one architecture to emulate another architecture. For instance, emulator code 912 allows machines based on architectures other than the z/Architecture, such as PowerPC processors, pSeries servers, or other servers or processors, to emulate the z/Architecture and to execute software and instructions developed based on the z/Architecture.

Figure 9B:
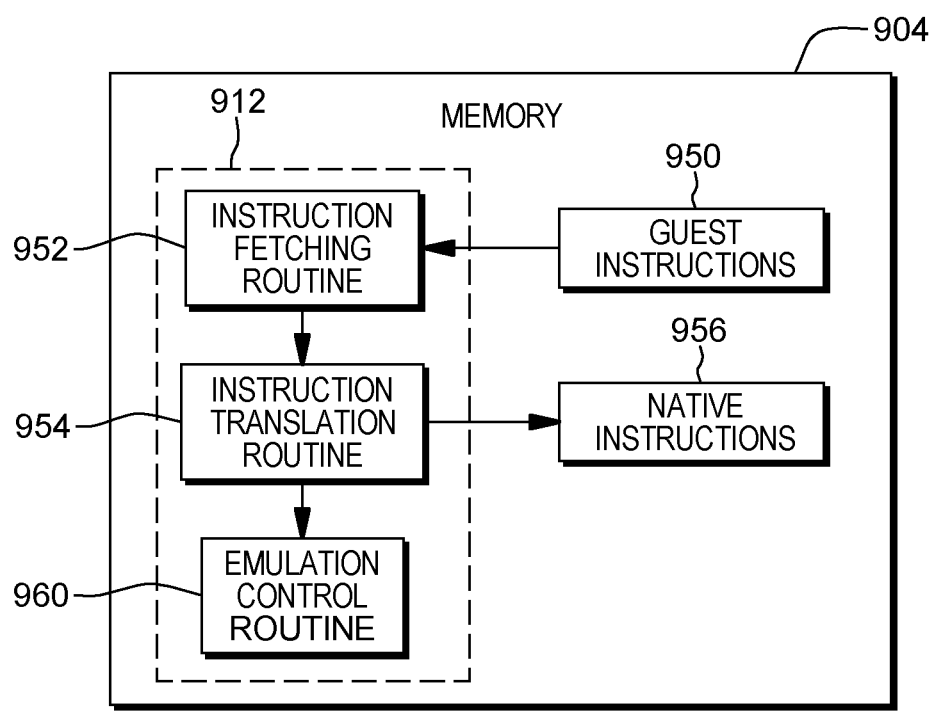
FIG. 9B depicts further details of the memory of FIG. 9A, in accordance with an aspect of the present invention.

Further details relating to emulator code 912 are described with reference to FIG. 9B. Guest instructions 950 stored in memory 904 comprise software instructions (e.g., correlating to machine instructions) that were developed to be executed in an architecture other than that of native CPU 902. For example, guest instructions 950 may have been designed to execute on a z/Architecture processor, but instead, are being emulated on native CPU 902, which may be, for example, an Intel processor. In one example, emulator code 912 includes an instruction fetching routine 952 to obtain one or more guest instructions 950 from memory 904, and to optionally provide local buffering for the instructions obtained. It also includes an instruction translation routine 954 to determine the type of guest instruction that has been obtained and to translate the guest instruction into one or more corresponding native instructions 956. This translation includes, for instance, identifying the function to be performed by the guest instruction and choosing the native instruction(s) to perform that function.

Further, emulator code 912 includes an emulation control routine 960 to cause the native instructions to be executed. Emulation control routine 960 may cause native CPU 902 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 956 may include loading data into a register from memory 904; storing data back to memory from a register; or performing some type of arithmetic or logic operation, as determined by the translation routine.

Each routine is, for instance, implemented in software, which is stored in memory and executed by native central processing unit 902. In other examples, one or more of the routines or operations are implemented in firmware, hardware, software or some combination thereof. The registers of the emulated processor may be emulated using registers 910 of the native CPU or by using locations in memory 904. In embodiments, guest instructions 950, native instructions 956 and emulator code 912 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 950 that is obtained, translated and executed is, for instance, an instruction of the guarded storage facility, a number of which are described herein. The instruction, which is of one architecture (e.g., the z/Architecture), is fetched from memory, translated and represented as a sequence of native instructions 956 of another architecture (e.g., PowerPC, pSeries, Intel, etc.). These native instructions are then executed.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
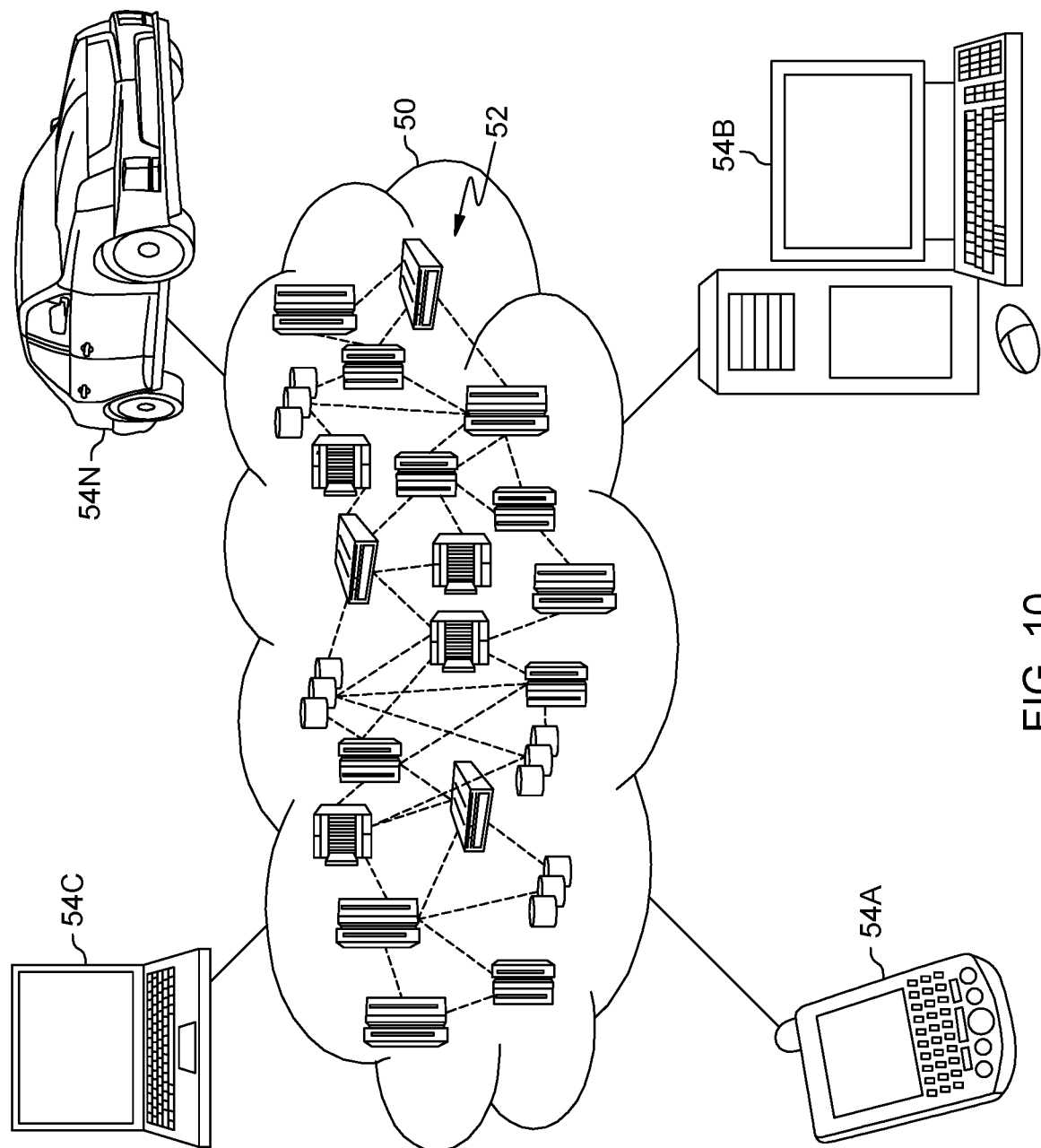
FIG. 10 depicts an embodiment of a cloud computing environment which can implement, or be used in association with, certain aspects of an embodiment of the present invention.

A cloud computing node can include a computer system/server, such as the one depicted in FIG. 10. Computer system/server 802 of FIG. 8A or 902 of FIG. 9A can be practiced in distributed cloud computing environments where tasks are performed by remote processing devices that are linked through a communications network. In a distributed cloud computing environment, program modules may be located in both local and remote computer system storage media including memory storage devices. Computer system/server 802, 902 is capable of being implemented and/or performing any of the functionality set forth hereinabove.

Referring now to FIG. 10, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 11:
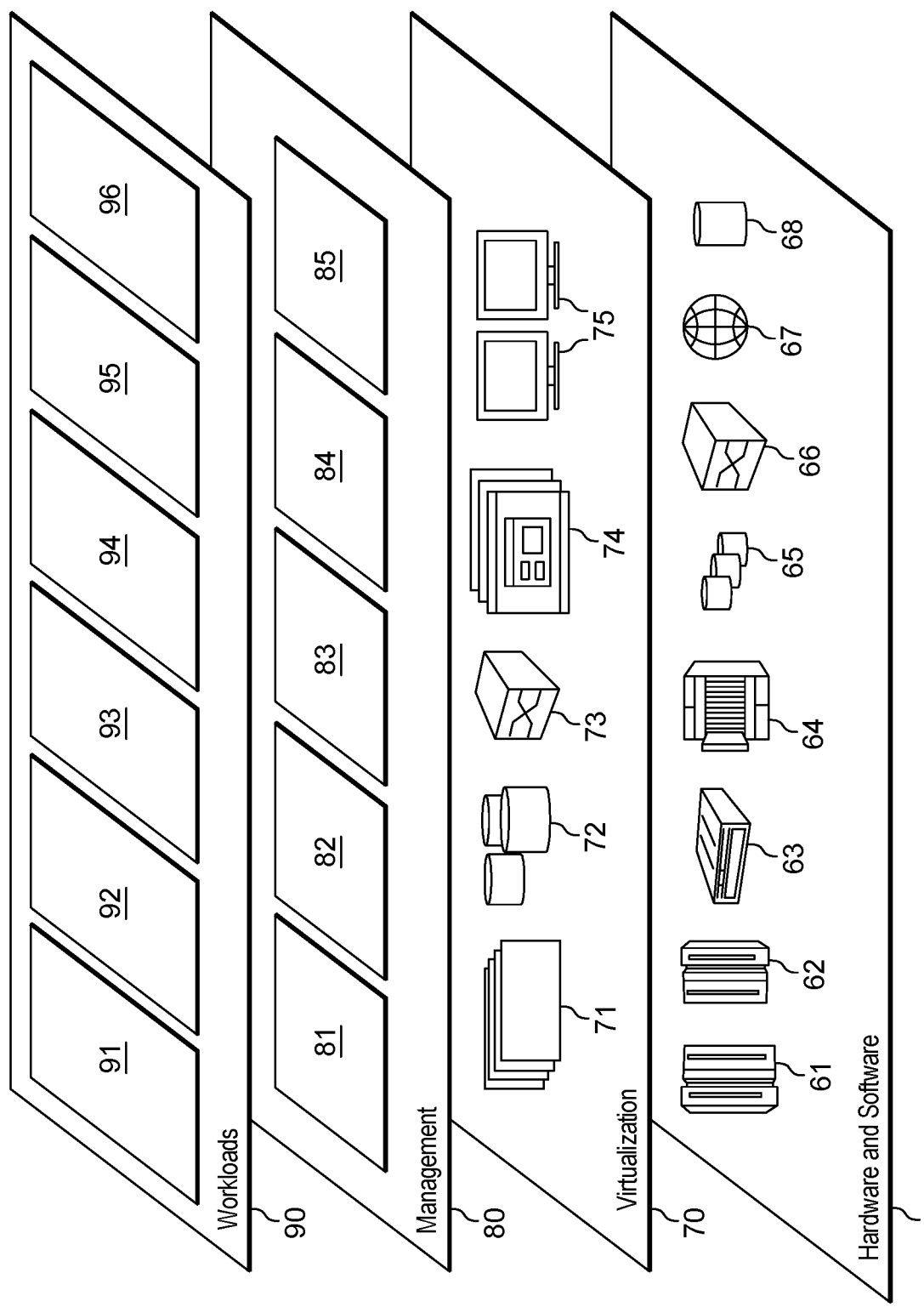
FIG. 11 depicts abstraction model layers according to an embodiment of the present invention.

Referring to FIG. 11, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication system processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local-area network, a wide-area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local-area network (LAN) or a wide-area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product for authentication processing within an authentication system, the computer program product comprising:
   a computer-readable storage medium readable by a processing circuit and storing instructions for performing a method, the method comprising:
      generating an authentication parameter as a function of a time-dependent input using a predetermined transformation having an inverse transformation, the time-dependent input being recoverable from the authentication parameter using the inverse transformation, and the authentication system supporting multiple authentication modes, a bit-length of the time-dependent input for one authentication mode of the multiple authentication modes being different from a bit-length of the time-dependent input for another authentication mode of the multiple authentication modes, and the generating being dependent, in part, on whether the time-dependent input is of the one authentication mode or the other authentication mode;
      generating a time-dependent password comprising a character string from the authentication parameter using another predetermined transformation having another inverse transformation, the authentication parameter being recoverable from the time-dependent password using the other inverse transformation;
      forwarding the time-dependent password to an authenticator of the authentication system for authentication; and
      wherein generating the authentication parameter comprises:
         splitting the time-dependent input into one segment (part_a) and another segment (part_b);
         performing multiple rounds of transformation of the time-dependent input using the one segment (part_a) and the other segment (part_b) to obtain a final part_a and a final part_b, wherein a round of transformation of the multiple rounds of transformation includes transforming a current part_a and a current part_b using, at least in part, a sign-on key, a round-specific value, and a transformation process, the round-specific value changing with each round of transformation of the multiple rounds of transformation;
         based on performing the multiple rounds of transformation, combining the final part_a and the final part_b to form the authentication parameter; and
      wherein one or more rounds of transformation of the multiple rounds of transformation comprise a process which depends, in part, on whether the authentication system is currently using the one authentication mode or the other authentication mode.

2. The computer program product of claim 1, wherein where the time-dependent input is of the one authentication mode, the time-dependent input is a binary input of an odd number of bits.

3. The computer program product of claim 2, wherein where the time-dependent input is of the other authentication mode, the time-dependent input is a binary input of an even number of bits.

4. The computer program product of claim 3, wherein the time-dependent input of the one authentication mode comprises 41 bits, and the time-dependent input of the other authentication mode comprises 48 bits.

5. The computer program product of claim 1, wherein the one authentication mode is an UPPER authentication mode where the sign-on key uses uppercase letters and numbers only, and the other authentication mode is a MIXED authentication mode where the sign-on key uses any of uppercase and lowercase letters, numbers, and one or more special characters.

6. The computer program product of claim 1, wherein during performing the multiple rounds of transformation of part_a and part_b, at least one round of transformation includes generating a new part_a by transforming the current part_a using the current part_b and generating a new part_b by transforming the current part_b using the new part_a.

7. The computer program product of claim 1, wherein the round-specific value comprises a current value of a round counter, the current value of the round counter changing with each round of transformation of the multiple rounds of transformation, and wherein the transformation process is a message authentication code (MAC) process.

8. The computer program product of claim 1, further comprising:
regenerating the authentication parameter from the time-dependent password presented to the authenticator using the other inverse transformation;
regenerating the time-dependent input from the authentication parameter using the inverse transformation; and
granting access to a resource where the regenerated time-dependent value is within a predetermined tolerance of a reference time-dependent value, otherwise, denying access to the resource.

9. A computer system for authentication processing within an authentication system, the computer system comprising:
a memory;
one or more processors in communication with the memory; and
program code executable by the one or more processors via the memory to perform a method comprising:
generating an authentication parameter as a function of a time-dependent input using a predetermined transformation having an inverse transformation, the time-dependent input being recoverable from the authentication parameter using the inverse transformation, and the authentication system supporting multiple authentication modes, a bit-length of the time-dependent input for one authentication mode of the multiple authentication modes being different from a bit-length of the time-dependent input for another authentication mode of the multiple authentication modes, and the generating being dependent, in part, on whether the time-dependent input is of the one authentication mode or the other authentication mode;
generating a time-dependent password comprising a character string from the authentication parameter using another predetermined transformation having another inverse transformation, the authentication parameter being recoverable from the time-dependent password using the other inverse transformation;
forwarding the time-dependent password to an authenticator of the authentication system for authentication, and
wherein generating the authentication parameter comprises:
splitting the time-dependent input into one segment (part_a) and another segment (part_b);
performing multiple rounds of transformation of the time-dependent input using the one segment (part_a) and the other segment (part_b) to obtain a final part_a and a final part_b, wherein a round of transformation of the multiple rounds of transformation includes transforming a current part_a and a current part_b using, at least in part, a sign-on key, a round-specific value, and a transformation process, the round-specific value changing with each round of transformation of the multiple rounds of transformation;
based on performing the multiple rounds of transformation, combining the final part_a and the final part_b to form the authentication parameter; and
wherein one or more rounds of transformation of the multiple rounds of transformation comprise a process which depends, in part, on whether the authentication system is currently using the one authentication mode or the other authentication mode.

10. The computer system claim 9, wherein where the time-dependent input is of the one authentication mode, the time-dependent input is a binary input of an odd number of bits.

11. The computer system of claim 10, wherein where the time-dependent input is of the other authentication mode, the time-dependent input is a binary input of an even number of bits.

12. The computer system of claim 9, wherein the one authentication mode is an UPPER authentication mode where the sign-on key uses uppercase letters and numbers only, and the other authentication mode is a MIXED authentication mode where the sign-on key uses any of uppercase and lowercase letters, numbers, and one or more special characters.

13. The computer system of claim 9, wherein the round-specific value comprises a current value of a round counter, the current value of the round counter changing with each round of transformation of the multiple rounds of transformation, and wherein the transformation process is a message authentication code (MAC) process.

14. A method of authentication processing within an authentication system, the method comprising:
generating an authentication parameter as a function of a time-dependent input using a predetermined transformation having an inverse transformation, the time-dependent input being recoverable from the authentication parameter using the inverse transformation, and the authentication system supporting multiple authentication modes, a bit-length of the time-dependent input for one authentication mode of the multiple authentication modes being different from a bit-length of the time-dependent input for another authentication mode of the multiple authentication modes, and the generating being dependent, in part, on whether the time-dependent input is of the one authentication mode or the other authentication mode;
generating a time-dependent password comprising a character string from the authentication parameter using another predetermined transformation having another inverse transformation, the authentication parameter being recoverable from the time-dependent password using the other inverse transformation;
forwarding the time-dependent password to an authenticator of the authentication system for authentication, and
wherein generating the authentication parameter comprises:
splitting the time-dependent input into one segment (part_a) and another segment (part_b);
performing multiple rounds of transformation of the time-dependent input using the one segment (part_a) and the other segment (part_b) to obtain a final part_a and a final part_b, wherein a round of transformation of the multiple rounds of transformation includes transforming a current part_a and a current part_b using, at least in part, a sign-on key, a round-specific value, and a transformation process, the round-specific value changing with each round of transformation of the multiple rounds of transformation;

based on performing the multiple rounds of transformation, combining the final part_a and the final part_b to form the authentication parameter; and wherein one or more rounds of transformation of the multiple rounds of transformation comprise a process which depends, in part, on whether the authentication system is currently using the one authentication mode or the other authentication mode.

15. The method of claim 14, wherein where the time-dependent input is of the one authentication mode, the time-dependent input is a binary input of an odd number of bits, and where the time-dependent input is of the other authentication mode, the time-dependent input is a binary input of an even number of bits.

* * * * *